US012762440B2

(12) United States Patent
Sengupta et al.

(10) Patent No.: US 12,762,440 B2
(45) Date of Patent: Oct. 13, 2026

(54) MACHINE LEARNING TECHNIQUES FOR DENOISING INPUT SEQUENCES

(71) Applicant: Optum, Inc., Minnetonka, MN (US)

(72) Inventors: Ayan Sengupta, Noida (IN); Amit Kumar, Gaya (IN); Suman Roy, Bangalore (IN); Sourabh Kumar Bhattacharjee, Delhi (IN)

(73) Assignee: Optum, Inc., Minnetonka, MN (US)

( * ) Notice: Subject to any disclaimer, the term of this patent is extended or adjusted under 35 U.S.C. 154(b) by 1189 days.

(21) Appl. No.: 17/471,886

(22) Filed: Sep. 10, 2021

(65) Prior Publication Data

US 2023/0082485 A1 Mar. 16, 2023

(51) Int. Cl.
*G06N 20/00* (2019.01)
*G06N 7/08* (2006.01)

(52) U.S. Cl.
CPC ............... *G06N 7/08* (2013.01); *G06N 20/00* (2019.01)

(58) Field of Classification Search
CPC ................................ G06N 20/00; G06N 7/08
See application file for complete search history.

(56) References Cited

U.S. PATENT DOCUMENTS 9,600,473 B2 3/2017 Leydon et al.
9,836,671 B2 * 12/2017 Gao ................ G06V 30/19173
10,115,055 B2 10/2018 Weiss et al.
10,388,272 B1 * 8/2019 Thomson ............... G10L 15/22
10,599,885 B2 3/2020 Galitsky
11,881,041 B2 * 1/2024 Khan .................... G06N 20/00
2013/0096911 A1 4/2013 Beaufort et al.
2018/0341860 A1 * 11/2018 Shazeer ................ G06N 3/045
2020/0097750 A1 3/2020 Tanaka
2020/0152180 A1 * 5/2020 Lee ....................... G06F 40/274
2020/0226367 A1 7/2020 Guo et al.
2021/0192140 A1 * 6/2021 Galley .................. G06N 3/044
(Continued)

FOREIGN PATENT DOCUMENTS

CN 105679317 A * 6/2016 ............. G10L 15/02
CN 107979764 A * 5/2018 ......... G06K 9/00744
CN 108304390 A * 7/2018 ............... G06N 3/08
(Continued)

OTHER PUBLICATIONS

Tom Young, etc., "Recent Trends in Deep Learning Based Natural Language Processing", published in arXiv as of Nov. 25, 2018, retrieved Jan. 30, 2025. (Year: 2018).*
(Continued)

*Primary Examiner* — Shourjo Dasgupta
(74) *Attorney, Agent, or Firm* — Alston & Bird LLP

(57) ABSTRACT

Various embodiments of the present invention provide methods, apparatus, systems, computing devices, computing entities, and/or the like for performing data denoising. Certain embodiments of the present invention utilize systems, methods, and computer program products that perform data denoising by utilizing at least one of encoder transformer machine learning models, decoder transformer machine learning models, contextual relevance determination non-linear machine learning models, contextual relevance decision-making machine learning models, denoising decision-making machine learning model, and denoising decision gates.

20 Claims, 10 Drawing Sheets

(56) References Cited

U.S. PATENT DOCUMENTS

| | | | | |
|---|---|---|---|---|
| 2021/0279638 | A1 * | 9/2021 | Kano | G06F 18/22 |
| 2021/0294829 | A1 * | 9/2021 | Bender | G10L 15/197 |

FOREIGN PATENT DOCUMENTS

| | | | | | |
|---|---|---|---|---|---|
| CN | 110674252 | A | * | 1/2020 | G06F 16/3344 |
| CN | 110852087 | A | * | 2/2020 | |
| CN | 111209740 | A | | 5/2020 | |
| CN | 111597224 | A | * | 8/2020 | G06F 18/22 |
| WO | WO-2019052293 | A1 | * | 3/2019 | G06F 40/58 |

OTHER PUBLICATIONS

Jo Schlemper, etc., “Attention gated networks: Learning to leverage salient regions in medical images”, published in Medical Image Analysis 53, pp. 197-207, 2019, available online as of Feb. 5, 2019, retrieved Jan. 30, 2025. (Year: 2019).*

Jiani Zhang, etc., “GaAN: Gated Attention Networks for Learning on Large and Spatiotemporal Graphs”, published in arXiv as of Mar. 20, 2018, retrieved Jan. 30, 2025. (Year: 2018).*

Lanqing Xue. etc., “Not All Attention Is Needed: Gated Attention Network for Sequence Data”, published via The 34th AAAI Conference on Artificial Intelligence, 2020, retrieved Jan. 30, 2025. (Year: 2020).*

Natasha Jeppu, etc., “Extending Denoising AutoEncoders for Feature Recognition”, published via 2018 International Conference on Advances in Computing, Communications and Informatics (ICACCI), retrieved Jan. 30, 25. (Year: 2018).*

Kazi Nazmul Haque, etc., “Image denoising and restoration with CNN-LSTM Encoder Decoder with Direct Attention”, published via arXiv as of Jan. 16, 2018, retrieved Jan. 30, 2025. (Year: 2018).*

Salman Khan, etc., “Transformers in Vision: A Survey”, published via arXiv as of Sep. 8, 2021, retrieved Jan. 30, 2025. (Year: 2021).*

Lucas Robinet, “Autoencoders and the Denoising Feature: From Theory to Practice”, published at https://towardsdatascience.com/autoencoders-and-the-denoising-feature-from-theory-to-practice-db7f7ad8fc78 on Nov. 26, 2020, retrieved Jan. 30, 2025. (Year: 2020).*

Robin Vinod, “A detailed explanation of the Attention U-Net”, published at https://towardsdatascience.com/a-detailed-explanation-of-the-attention-u-net-b371a5590831 on May 1, 2020, retrieved Jan. 30, 2025. (Year: 2020).*

Francois Chollet, “Building Autoencoders in Keras”, published at https://blog.keras.io/building-autoencoders-in-keras.html on May 14, 2016, retrieved Jan. 30, 2025. (Year: 2016).*

Zeyu Liang, etc., “Gated Graph Neural Attention Networks for abstractive summarization”, published in Neurocomputing 431, pp. 128-136, 2021, available online as of Oct. 23, 2020, retrieved Jan. 30, 2025. (Year: 2021).*

Leslie Casas, etc., “Adversarial Signal Denoising with Encoder-Decoder Networks”, published in 2020 28th European Signal Processing Conference (EUSIPCO), pp. 1467-1471, 2020, retrieved Jan. 30, 2025. (Year: 2020).*

Shuxia Ren, etc., “Text Summarization Model of Combining Global Gated Unit and Copy Mechanism”, published via 2019 IEEE 10th International Conference on Software Engineering and Service Science (ICSESS) (2019, pp. 390-393) as of Oct. 1, 2019, retrieved Jan. 31, 2025. (Year: 2019).*

Hieu Tran, etc., “Hierarchical Transformer Encoders for Vietnamese Spelling Correction”, published May 28, 2021 to arXiv, retrieved Aug. 8, 2025. (Year: 2021).*

Lena Voita, etc., “Sequence to Sequence (seq2seq) and Attention”, published Oct. 3, 2020 to https://lena-voita.github.io/nlp_course/seq2seq_and_attention.html, retrieved Aug. 8, 2025. (Year: 2020).*

Guangxu Xun, etc., “A Survey on Context Learning”, published via IEEE Transactions on Knowledge and Data Engineering, vol. 29, No. 1, Jan. 2017, retrieved Nov. 6, 2025. (Year: 2017).*

Zhilin Yang, etc., “XLNet: Generalized Autoregressive Pretraining for Language Understanding”, published on Jun. 19, 2019 to arXiv, retrieved Nov. 6, 2025. (Year: 2019).*

Peng Shi, etc., “Learning Contextual Representations for Semantic Parsing with Generation-Augmented Pre-Training”, published via The Thirty-Fifth AAAI Conference on Artificial Intelligence (AAAI-21), retrieved Nov. 6, 2025. (Year: 2021).*

Marjan Ghazvininejad, etc., “Mask-Predict: Parallel Decoding of Conditional Masked Language Models”, publ. via Conf. on Empirical Methods in Natural Language Processing and 9th Intl. Joint Conf. on Natural Language Processing, pp. 6112-6121, Hong Kong, China, Nov. 3-Nov. 7, 2019, retrieved Nov. 6, 2025. (Year: 2019).*

Ye Bai, etc., “Fast End-to-End Speech Recognition via Non-Autoregressive Models and Cross-Modal Knowledge Transferring from BERT”, published via Journal of Latex Class Files, vol. 14, No. 8, Aug. 2015, retrieved Nov. 6, 2025. (Year: 2015).*

Kaitao Song, etc., “MASS: Masked Sequence to Sequence Pre-training for Language Generation”, published via 36th International Conference on Machine Learning, Long Beach, California, PMLR 97, 2019, retrieved Nov. 6, 2025. (Year: 2019).*

Hao Tan, etc., “VIMPAC: Video Pre-Training via Masked Token Prediction and Contrastive Learning”, published on Jun. 21, 2021 via arXiv, retrieved Nov. 6, 2025. (Year: 2021).*

“Contextual Spell Check,” spaCy Universe, (29 pages), (online), [Retrieved from the Internet May 20, 2021] <URL: https://spacy.io/universe/project/contextualSpellCheck>.

“Inspire Confidence In Your Work With Clear Effective Communication,” Grammarly, (7 pages), (online), [Retrieved from the Internet Oct. 27, 2021] <URL: https://www.grammarly.com/p>.

“Spell Checker,” Ginger, (3 pages), (online), [Retrieved from the Internet Oct. 27, 2021] <URL: https://www.gingersoftware.com/spellcheck>.

“State Of The Art Natural Language Processing,” John Snow Labs, (14 pages), (online), [Retrieved from the Internet Oct. 27, 2021] <URL: https://www.johnsnowlabs.com/spark-nlp/>.

“Wolfgarb/SymSpell,” GitHub, (14 pages), (online), [Retrieved from the Internet Oct. 27, 2021] <URL: https://github.com/wolfgarbe/SymSpell>.

Bhashkar, Kunal. “Spelling Correction Using Deep Learning: How Bi-Directional LSTM With Attention Flow Works In Spelling Correction,” (29 pages), Feb. 13, 2019, (article, online), [Retrieved from the Internet May 20, 20210] <URL: https://bhashkarkunal.medium.com/spelling-correction-using-deep-learning-how-bi-directional-lstm-with-attention-flow-works-in-366fabcc7a2f>.

Chollampatt, Shamil et al. “A Multilayer Convolutional Encoder-Decoder Neural Network for Grammatical Error Correction,” The Thirty-Second AAAI Conference On Artificial Intelligence, vol. 32, No. 1, pp. 5755-5762, Apr. 26, 2018.

Devlin, Jacob et al. BERT: Pre-Training Of Deep Bidirectional Transformers For Language Understanding, In Proceedings of the 2019 Conference of the North American Chapter of the Association for Computational Linguistics: Human Language Technologies, vol. 1 (Long and Short Papers), pp. 4171-4186, Minneapolis, Minnesota, Jun. 2-7, 2019, Association for Computational Linguistics, DOI: 10.18653/ v1/N19-1423. URL https://www.aclweb.org/anthology/N19-1423.

He, Kaiming et al. “Deep Residual Learning for Image Recognition,” 2016 IEEE Conference on Computer Vision and Pattern Recognition (CVPR), Jun. 27, 2016, (published online: Dec. 12, 2016), pp. 770-778, DOI: 10.1109/CVPR.2016.90.

Huang, Zhiwei et al. “An Algorithm Based on Text Position Correction and Encoder-Decoder Network for Text Recognition in the Scene Image of Visual Sensors,” Sensors, vol. 10, No. 2942, pp. 1-14, May 22, 2020, DOI: 10.3390/s20102942.

Kuznetsov, Alex et al. “Spelling Correction With Denoising Transformer,” arXiv preprint arXiv:2105.05977v1, May 12, 2021, (9 pages).

Lewis, Mike et al. “BART: Denoising Sequence-to-Sequence Pre-training for Natural Language Generation, Translation, and Comprehension,” Proceedings of the 58th Annual Meeting of the Association for Computational Linguistics, Jul. 5, 2020, pp. 7871-7880.

(56) References Cited

OTHER PUBLICATIONS

Liu, Hongfang et al. "Towards A Semantic Lexicon For Clinical Natural Language Processing," AMIA Annual Symposium Proceedings, vol. 2012, pp. 568-576, Nov. 3, 2012, PMCID: PMC3540492, PMID: 23304329.
Ruch, Patrick et al. "Comparing Corpora and Lexical Ambiguity," The Workshop on Comparing Corpora, Oct. 7, 2000, pp. 14-19.
Ruch, Patrick et al. "Using Lexical Disambiguation and Named Entity Recognition To Improve Spelling Correction In The Electronic Patient Record," Artificial Intelligence In Medicine, vol. 29, pp. 169-184, Apr. 12, 2003, DOI: 10.1016/S0933-3657(03)00052-6.
Song, Kaitao et al. "MASS: Masked Sequence To Sequence Pretraining For Language Generation," In International Conference on Machine Learning, (11 pages), May 7, 2019.
Sun, Yifu et al. "Contextual Text Denoising With Masked Language Models," arXiv preprint arXiv:1910.14080v1, Oct. 30, 2019, (5 pages).
Vaswani, Ashish et al. "Attention Is All You Need," 31st Conference On Neural Information Processing Systems (NIPS), arXiv preprint arXiv:1706.03762v5, Dec. 6, 2017, (15 pages).
Wang, Alex et al. "GLUE: A Multi-Task Benchmark and Analysis Platform For Natural Language Understanding," arXiv preprint arXiv:1804.07461v1, Apr. 20, 2018, (14 pages).
Wang, Liang et al. "Denoising Based Sequence-To-Sequence Pre-Training For Text Generation," Proceedings of the 2019 Conference On Empirical Methods In Natural Language Processing and the 9th International Joint Conference On Natural Language Processing, pp. 4003-4015, Nov. 3, 2019, Hong Kong, China.
Xu, Kun et al. "SQL-To-Text Generation With Graph-To-Sequence Model," Proceedings of the 2018 Conference On Empirical Methods In Natual Language Processing, pp. 931-936, Brussels, Belgium, Oct. 31, 2018, DOI:10.18653/v1/D18-1112.
Yin, Kayo. "Cleaning Up Dirty Scanned Documents With Deep Learning, " Illuin|Medium, Jul. 30, 2019, (17 pages), (article, online), [Retrieved from the Internet Oct. 27, 2021] <URL: https://medium.com/illuin/cleaning-up-dirty-scanned-documents-with-deep-learning-2e8e6de6cfa6>.
Zhang, Shaohua et al. "Spelling Error Correction with Soft-Masked BERT," Proceedings of the 58th Annual Meeting of the Association For Computational Linguistics, pp. 882-890, Jul. 5, 2020.
Zhou, Li et al. "How Many Medication Orders Are Entered Through Free-Text In EHRS?—A Study On Hypoglycemic Agents," AMIA Annual Symposium Proceedings, vol. 2012, pp. 1079-1088, Nov. 3, 2012, PMCID: PMC3540584, PMID: 23304384.
Zuo, Ling-Qun et al. "Natural Scene Text Recognition Based On Encoder-Decoder Framework," IEEE Access, vol. 7, pp. 62616-62623, May 14, 2019, DOI: 10.1109/ACCESS.2019.2916616.

* cited by examiner

MACHINE LEARNING TECHNIQUES FOR DENOISING INPUT SEQUENCES

BACKGROUND

Various embodiments of the present invention address technical challenges related to performing data denoising. Various embodiments of the present invention address the shortcomings of existing structured database systems and disclose various techniques for efficiently and reliably performing data denoising.

BRIEF SUMMARY

In general, embodiments of the present invention provide methods, apparatus, systems, computing devices, computing entities, and/or the like for performing data denoising. Certain embodiments of the present invention utilize systems, methods, and computer program products that perform data denoising by utilizing at least one of encoder transformer machine learning models, decoder transformer machine learning models, contextual relevance determination non-linear machine learning models, contextual relevance decision-making machine learning models, denoising decision-making machine learning model, and denoising decision gates.

In accordance with one aspect, a method is provided. In one embodiment, the method comprises: for each current input token of the plurality of input tokens: (i) determining an input data object for the current input token; (ii) determining, based at least in part on the input data object and using an encoder transformer machine learning model, a contextual relevance representation for the current input token; and (iii) determining, based at least in part on the contextual relevance representation and a preceding denoised representation for a preceding input token for the current input token in accordance with the token order, and using a decoder transformer machine learning model, a denoised representation for the current input token; determining, using the processor and based at least in part on each denoising representation, the denoised sequence; and performing, using the processor, one or more prediction-based actions based at least in part on the denoised sequence.

In accordance with another aspect, a computer program product is provided. The computer program product may comprise at least one computer-readable storage medium having computer-readable program code portions stored therein, the computer-readable program code portions comprising executable portions configured to: for each current input token of the plurality of input tokens: (i) determine an input data object for the current input token; (ii) determine, based at least in part on the input data object and using an encoder transformer machine learning model, a contextual relevance representation for the current input token; and (iii) determine, based at least in part on the contextual relevance representation and a preceding denoised representation for a preceding input token for the current input token in accordance with the token order, and using a decoder transformer machine learning model, a denoised representation for the current input token; determine, using the processor and based at least in part on each denoised representation, the denoised sequence; and perform, using the processor, one or more prediction-based actions based at least in part on the denoised sequence.

In accordance with yet another aspect, an apparatus comprising at least one processor and at least one memory including computer program code is provided. In one embodiment, the at least one memory and the computer program code may be configured to, with the processor, cause the apparatus to: for each current input token of the plurality of input tokens: (i) determine an input data object for the current input token; (ii) determine, based at least in part on the input data object and using an encoder transformer machine learning model, a contextual relevance representation for the current input token; and (iii) determine, based at least in part on the contextual relevance representation and a preceding denoised representation for a preceding input token for the current input token in accordance with the token order, and using a decoder transformer machine learning model, a denoised representation for the current input token; determine, using the processor and based at least in part on each denoised representation, the denoised sequence; and perform, using the processor, one or more prediction-based actions based at least in part on the denoised sequence.

BRIEF DESCRIPTION OF THE DRAWINGS

Figure 1:
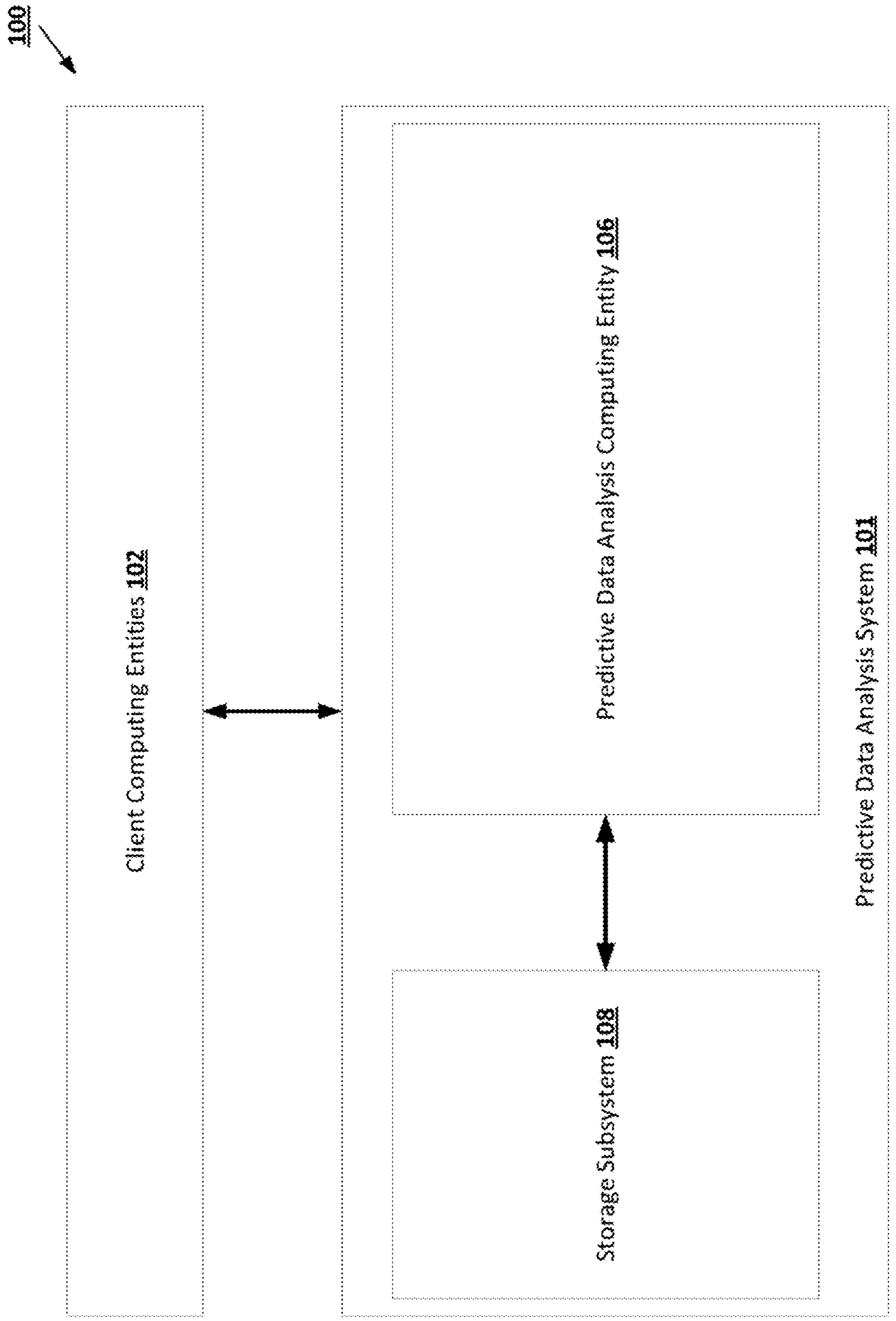

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
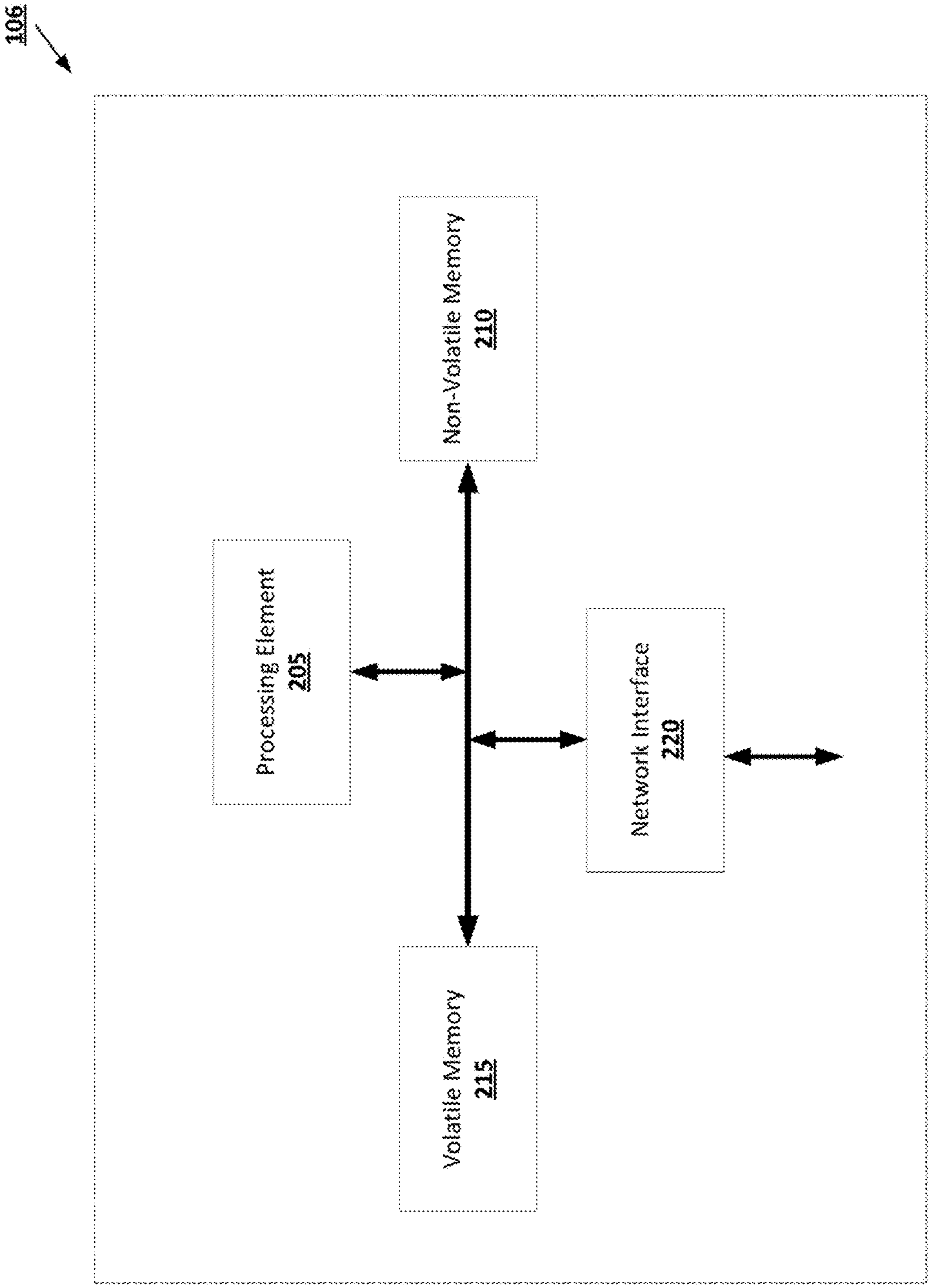

FIG. 2 provides an example predictive data analysis computing entity in accordance with some embodiments discussed herein.

Figure 3:
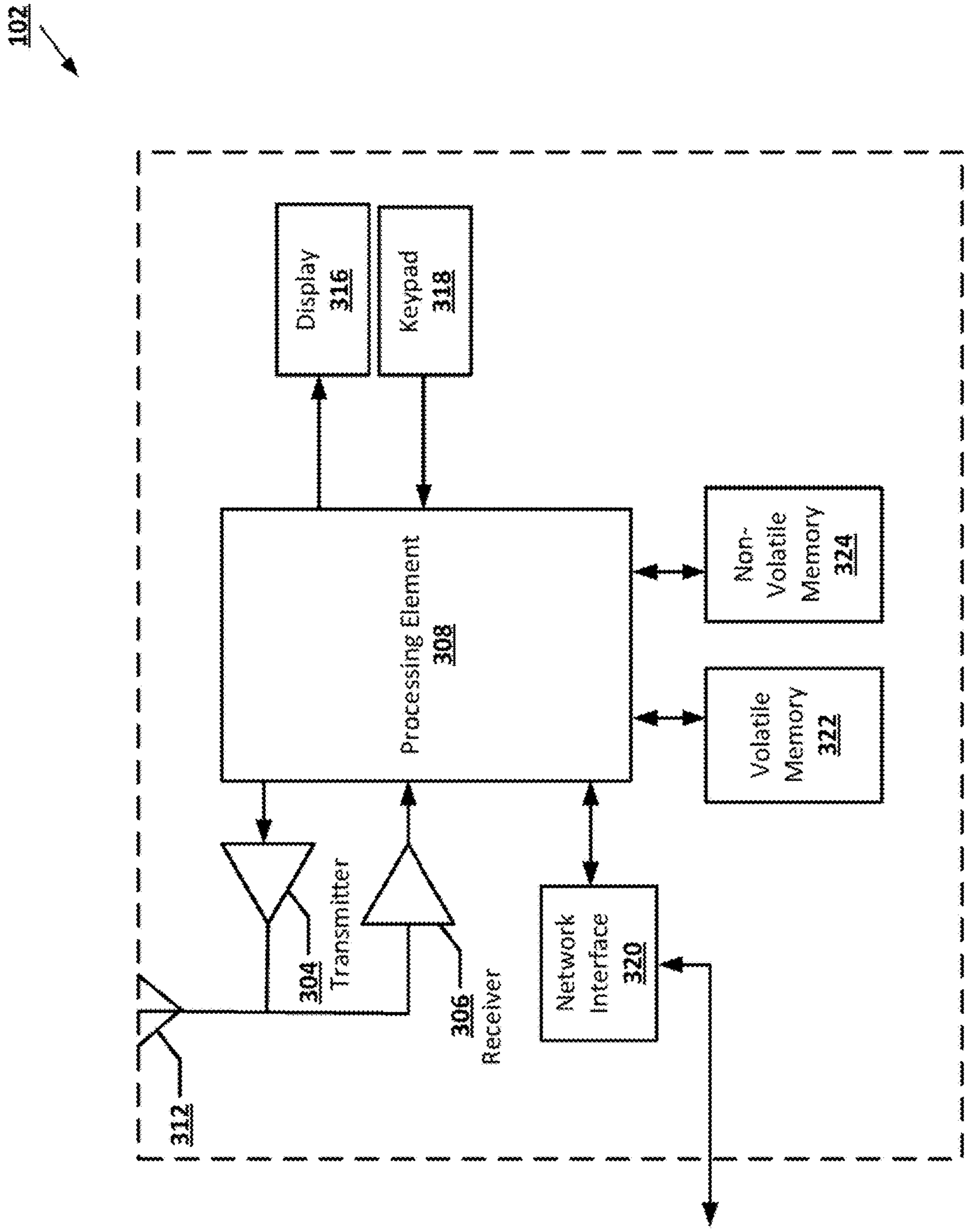

FIG. 3 provides an example external computing entity in accordance with some embodiments discussed herein.

Figure 4:
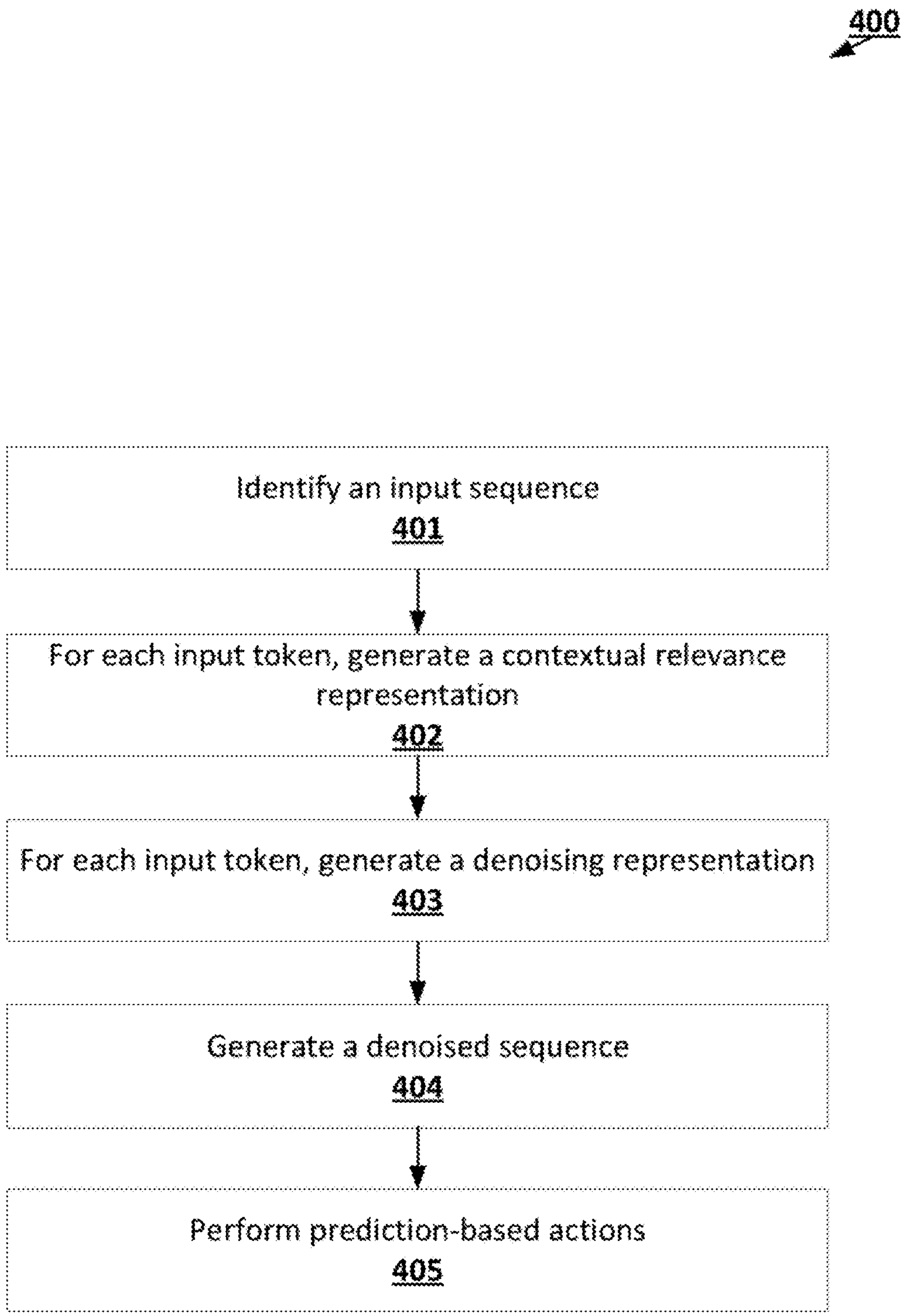

FIG. 4 is a flowchart diagram of an example process for generating a denoised sequence for an input sequence in accordance with some embodiments discussed herein.

Figure 5:
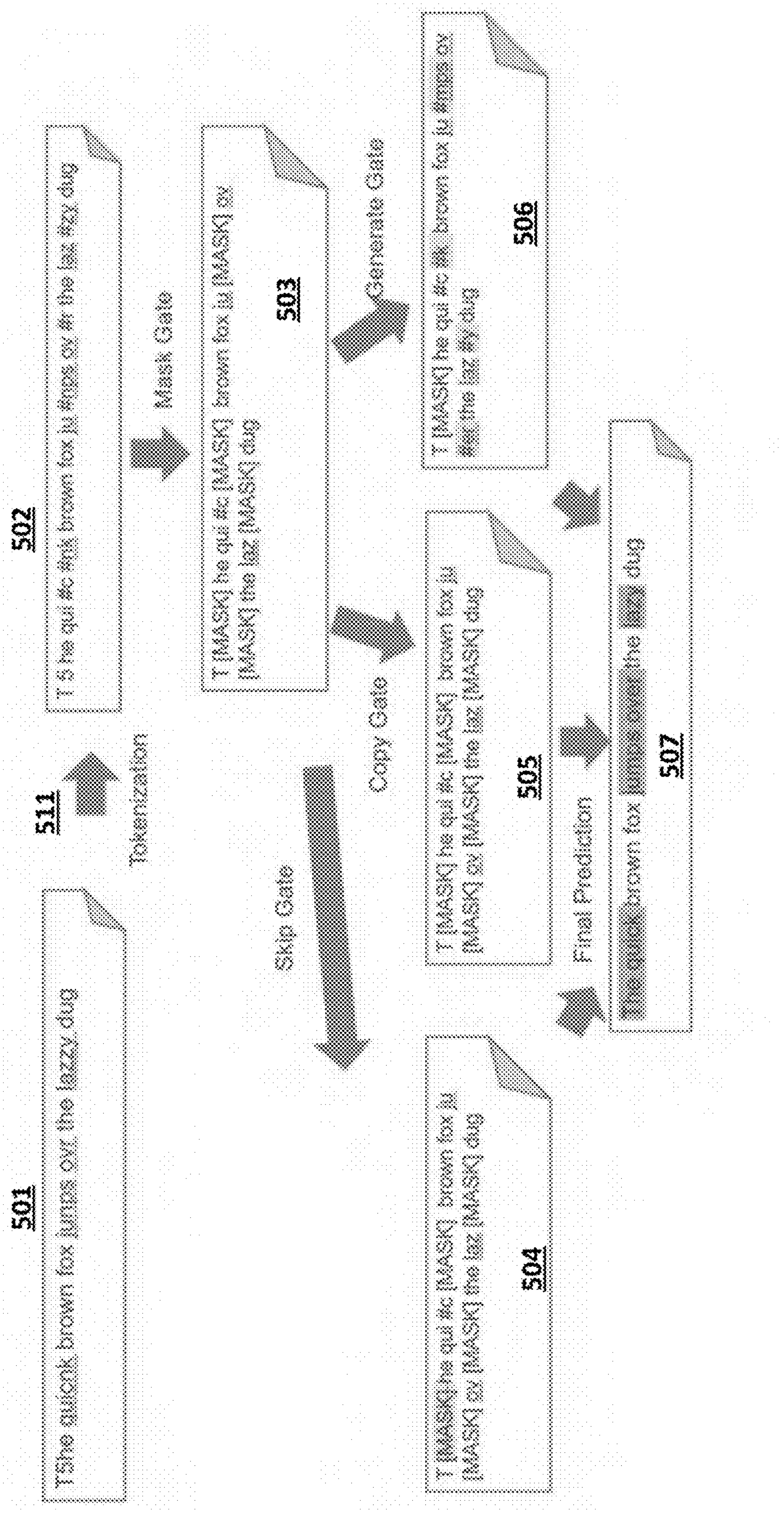

FIG. 5 provides an operational example of generating a denoised sequence for an input sequence in accordance with some embodiments discussed herein.

Figure 6:
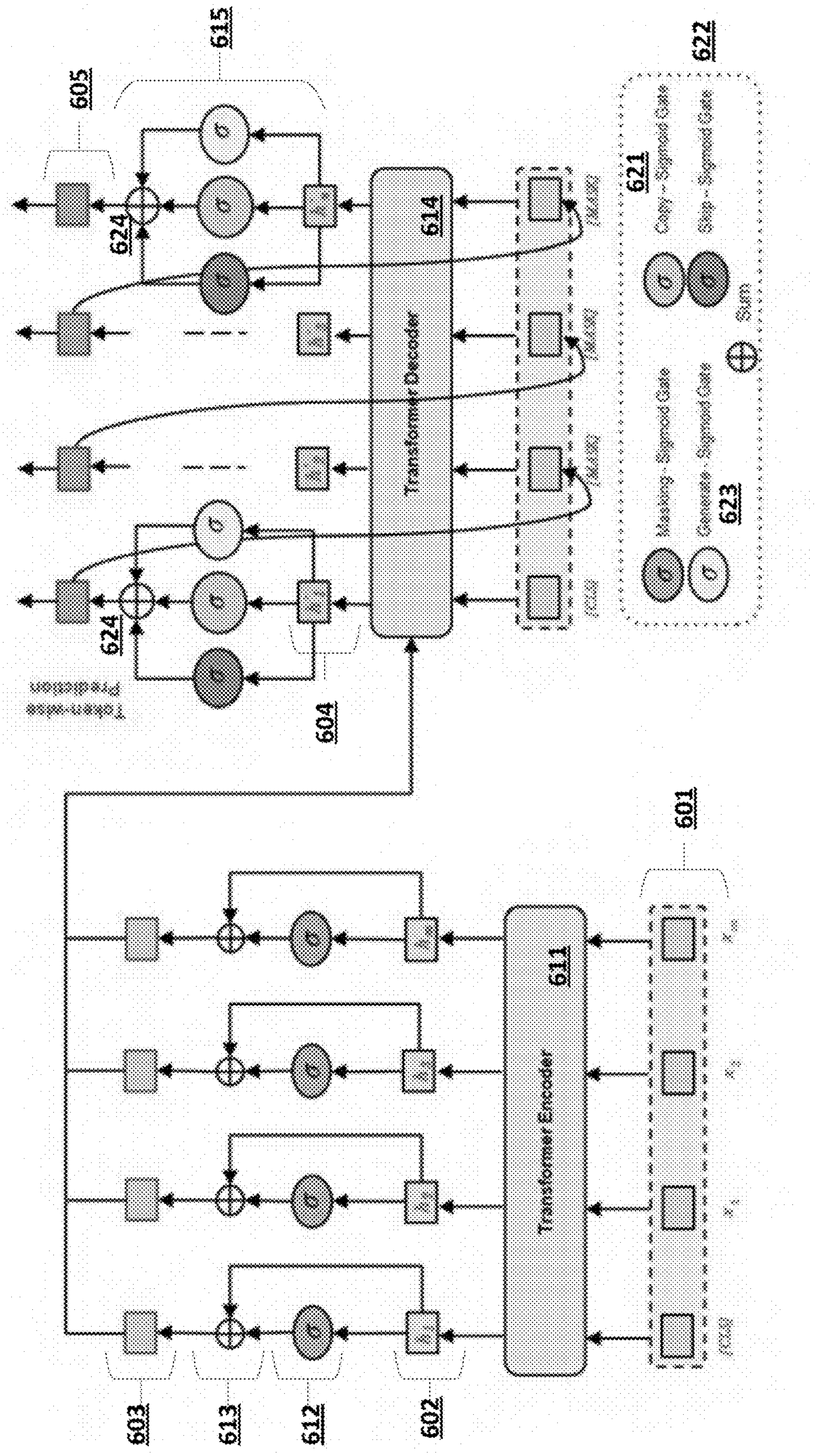

FIG. 6 provides an operational example of a machine learning framework for generating a denoised sequence for an input sequence in accordance with some embodiments discussed herein.

Figure 7:
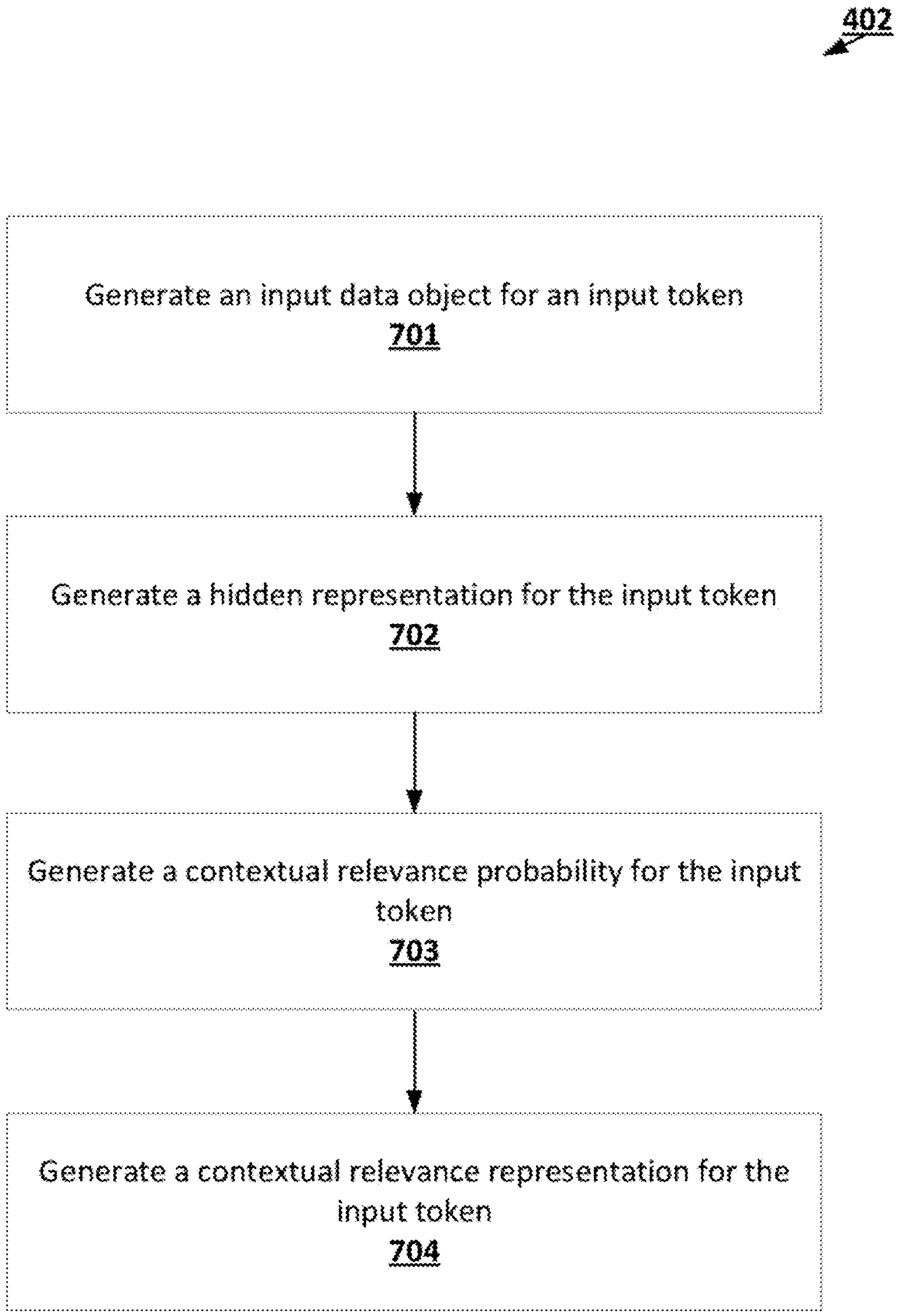

FIG. 7 is a flowchart diagram of an example process for generating a contextual relevance representation of an input token in an input sequence in accordance with some embodiments discussed herein.

Figure 8:
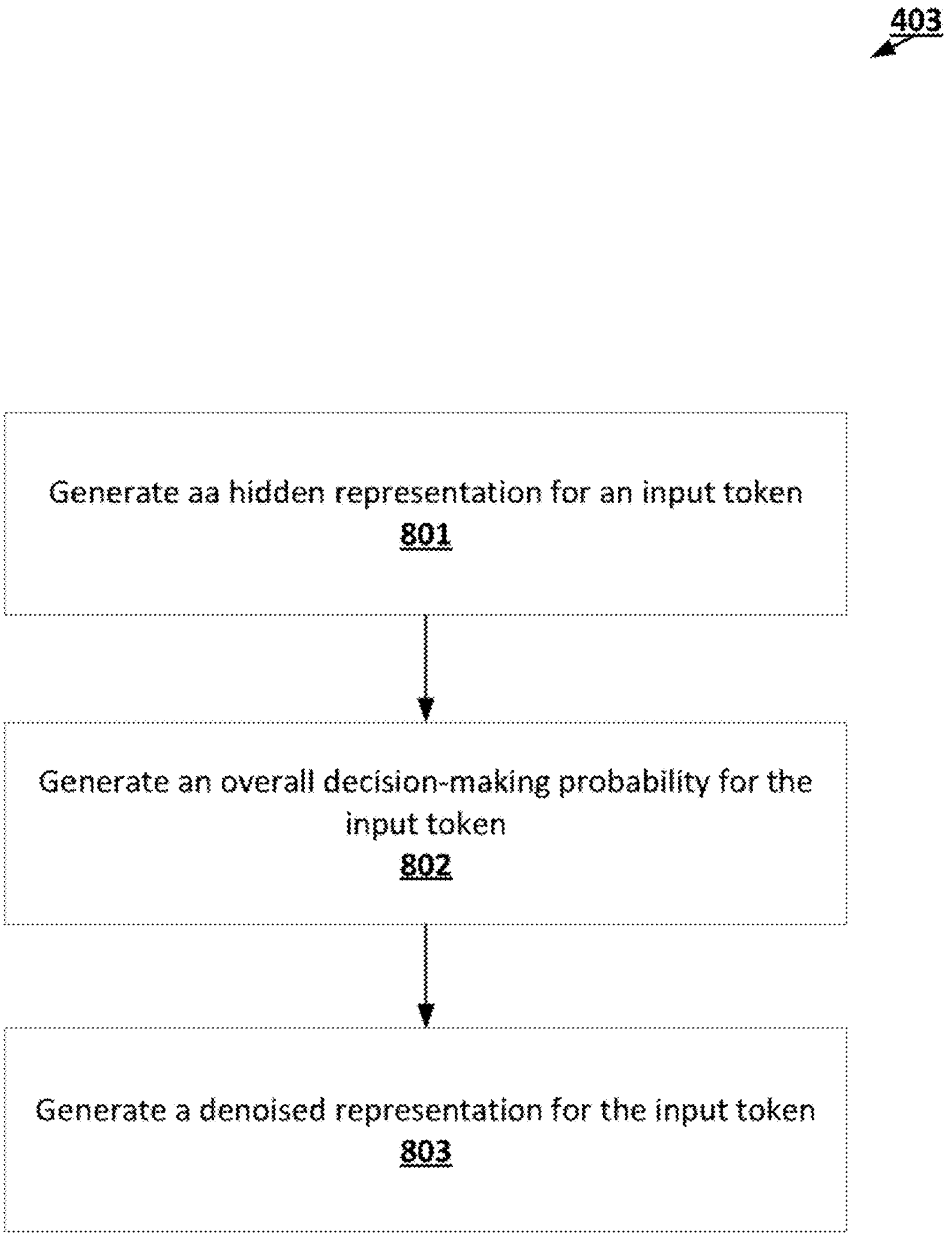

FIG. 8 is a flowchart diagram of an example process for generating denoised representation of an input token in an input sequence in accordance with some embodiments discussed herein.

Figure 9:
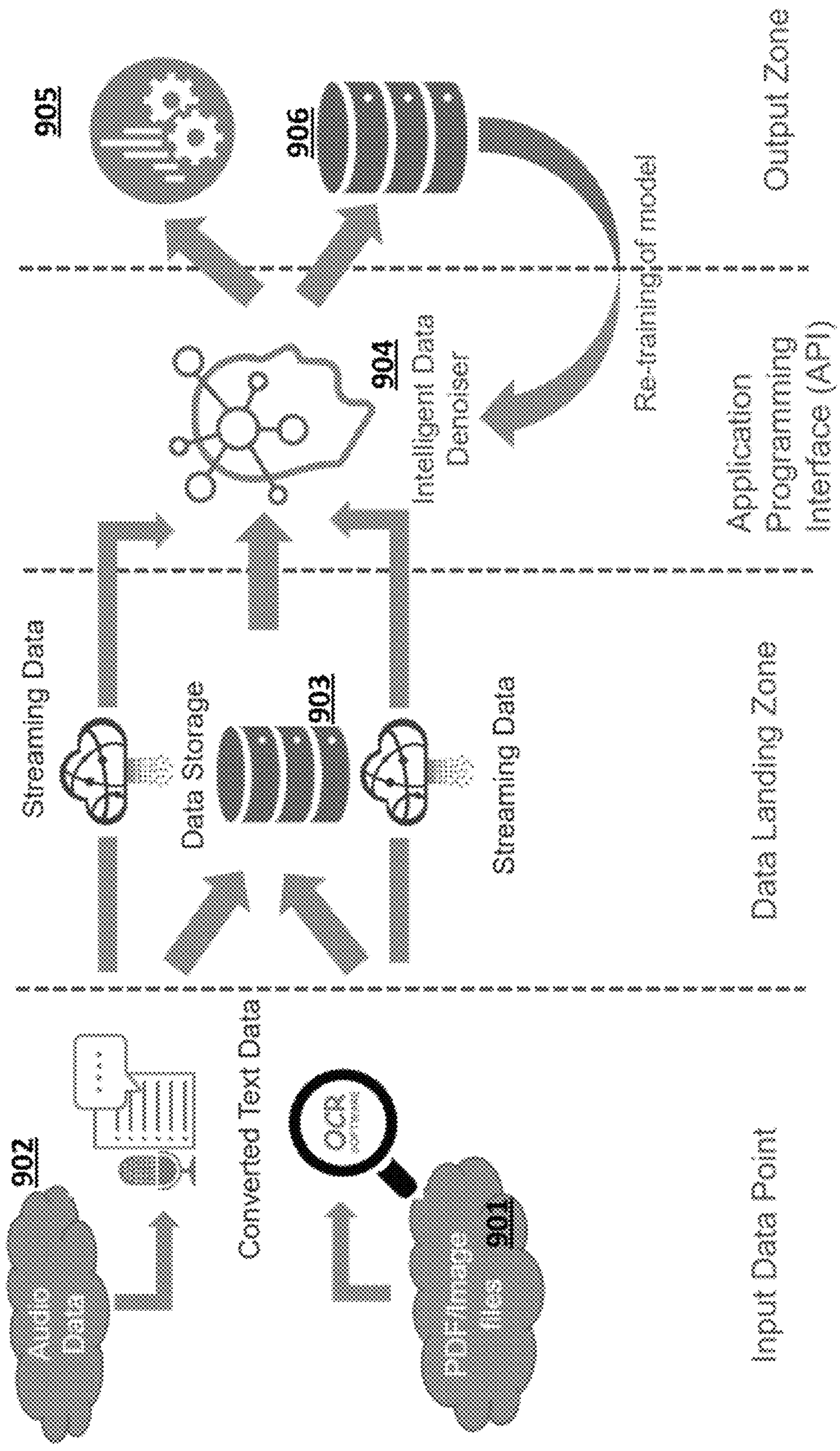

FIG. 9 provides an operational example of performing intelligent data denoising on the output of an optical character recognition engine and/or on the output of an automated speech recognition in accordance with some embodiments discussed herein.

Figure 10:
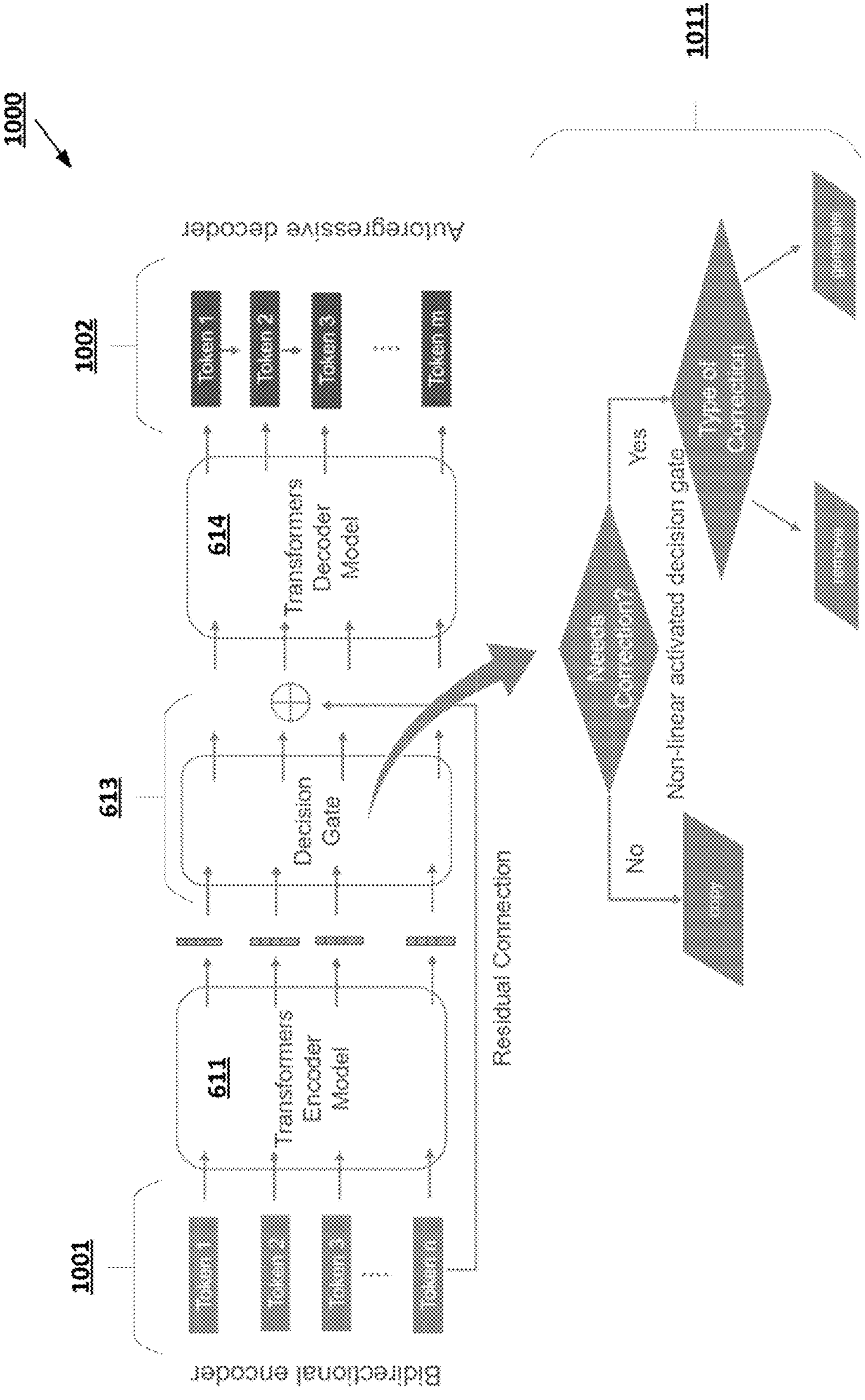

FIG. 10 provides an operational example of a machine learning framework of an intelligent data denoiser engine in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein;

rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention address technical challenges related to improving efficiency and reliability of textual search systems. Textual search systems rely on inferring patterns based on underlying textual data to generate search outputs in response to search queries. When the underlying textual data has inaccuracies (e.g., spelling errors and/or errors resulting from erroneous optical character recognition (OCR) and/or erroneous automated speech recognition (ASR) processes), the search operations are likely to generate inaccurate results. This, in turn, causes the users to perform repeated search operations which imposes operational load on textual search systems. In this way, textual inaccuracies impose both efficiency and reliability costs on textual search systems. By introducing techniques to enhance accuracy of textual data through denoising of textual data, various embodiments address the noted efficiency and reliability costs of textual search systems, and thus make important technical contributions to improving efficiency, reliability, and/or operational load of the textual search systems.

For example, various embodiments of the present invention utilize systems, methods, and computer program products that perform data denoising by utilizing at least one of encoder transformer machine learning models, decoder transformer machine learning models, contextual relevance determination non-linear machine learning models, contextual relevance decision-making machine learning models, denoising decision-making machine learning model, and denoising decision gates. By using the noted techniques, various embodiments of the present invention improve accuracy of textual data which, in turn, improves efficiency, reliability, and/or operational load of the textual search systems as described above.

Various embodiments of the present invention disclose a solution to remove noises from text data. Text data like social media conversations, surveys, feedbacks, e-mails, which are generated through natural process, often contain human errors that are difficult to be interpreted by machines. By reading the entire text and understanding its context, one can correct the noise and associate an overall meaning to the text. However, machine learning algorithms are prone to data noises. Text noises can affect the downstream model predictions and reduce their interpretability. Further, automatic data processing pipelines such as optical code recognition engines or speech-to-text engines often inject noises in the output. As such, a system can can categorize the noise associated with text data into two groups, the first group includes machine-generated text noises, and the second group includes noises generated due to human errors.

Various embodiments of the present invention disclose two different variant solutions for data denoising. In both the solutions, transformers are used as the base architecture. Transformers may use multi-headed self-attention to capture both local and global contexts from texts. Various embodiments of the present invention propose using two primary building blocks: an encoder to identify the noises in the data; and a decoder to correct the identified noises. The encoder may read the incorrect text data as input, extract an abstract representation from the text data, and identify the probability that each token of the text data is contextually incorrect. In some embodiments, a proposed system calculates three probabilities for each word token: a copy probability, a removal probability, and a generation probability. If the copy probability of token is greater than 0.5, the proposed system may copy the exact token from input to the output. For example, proper nouns in the texts can be copied directly to the output without making any changes. Using the removal probability of the token, the encoder decides whether the system should remove the entire token in the output or not. Finally, the generation probability is used to generate a new word token in case the word is contextually incorrect and needs to be corrected. These probability values are calculated using a decision gate. The decision may gate gives a proposed model the flexibility to understand the context better and generate correct text given a context. The decoder may, at each step, read the representation learnt by the encoder and the decoder output from the previous step to generate the corrected text data for the input text data in an autoregressive manner.

According to a first variant solution of a solution proposed by various embodiments of the present invention, a proposed system may pass just the incorrect text data to the encoder. According to a second variant solution proposed by the Intelligent Denoising concepts, a proposed system passes the incorrect text along with the original modality (image/audio data) of the incorrect text. So, according to the second variant solution, a proposed system may learn the representation from both the text and the original data, which helps in identifying the noise in the text data. For images, a proposed system may use pretrained convolution network to extract feature maps from the images. For speech data, a proposed system may first convert the speech data into spectrogram images and then run a convolution network to extract features of the spectrogram images. These features may then be combined with the text embeddings and passed onto the decision gate.

II. Definitions

The term "input sequence" may refer to a data construct that is configured to describe a sequence of tokens (e.g., a sequence of text tokens). An example of an input sequence is a sequence of text tokens generated by applying an optical code recognition (OCR) process to an input image data object, such as a sequence of text tokens that is determined (e.g., based at least in part on one or more sentence identification rules that are configured to process an overall sequence of text tokens generated using an OCR process to identify sentences based at least in part on the overall sequence) to correspond to a semantic linguistic construct such as a sentence. Another example of an input sequence is a sequence of text tokens generated by applying an automated speech recognition (ASR) process to an input audio data object, such as a sequence of text tokens that is determined (e.g., based at least in part on one or more sentence identification rules that are configured to process an overall sequence of text tokens generated using an ASR process to identify sentences based at least in part on the overall sequence) to correspond to a semantic linguistic construct such as a sentence. In some embodiments, an input sequence is associated with a token order, where the token order describes, for each input token, whether the input token is the nth token of the plurality of input tokens in the input sequence. For example, given the input sequence "T5he quicnk brown fox junps ovr the lazzy dug," where the input tokens of the input sequence comprise "T," "5," "he," "qui," "#c," "#nk," "brown," "fox," "ju," "#nps," "ov," "#r," "the," "laz," "#zy," and "dug," the token order for the given input sequence may define the following token order values for the noted input tokens: a token order of one for the input token "T," a token order of two for the input token "5," a token order of three for the input token "he," a token order of four for the input token "qui," a token order of five for the input token "#c," a token order of six for the input token "#nk," a token order of seven for the input token "brown," a token order of eight for the input token "fox," a token order of nine for the input token "ju," a token order of ten for the input token "#nps," a token order of eleven for the input token "ov," a token order of twelve for the input token "#r," a token order of thirteen for the input token "the," a token order of fourteen for the input token "laz," a token order of fifteen for the input token "#zy," and a token order of sixteen for the input token "dug."

The term "input data object" may refer to a data construct that is configured to describe an input representation of a corresponding input token that is provided as an input to an encoder transformer machine learning model. In some embodiments, the input data object for a corresponding input token is determined based at least in part on (e.g., comprises) the corresponding input token. In some embodiments, the input data object for a corresponding input token is determined based at least in part on (e.g., comprises) a one-hot encoding of the corresponding input token. In some embodiments, the input data object for a corresponding input token is determined based at least in part on (e.g., comprises) a token-wise image segment of an image data object that is associated with the corresponding input token. In some embodiments, the input data object for a corresponding input token is determined based at least in part on (e.g., comprises) an embedded representation of a token-wise image segment of an image data object that is associated with the corresponding input token. For example, in some embodiments, if an input token is determined based at least in part on the output applying an OCR process to a subset of pixels of an image data object, the token-wise image segment may comprise the subset of pixels, and the input data object may be determined based at least in part on the token-wise image segment and/or an embedded representation of the noted token-wise image segment. In some embodiments, the input data object for a corresponding input token is determined based at least in part on (e.g., comprises) a token-wise audio segment of an audio data object that is associated with the corresponding input token. In some embodiments, the input data object for a corresponding input token is determined based at least in part on (e.g., comprises) an embedded representation a token-wise audio segment of an audio data object that is associated with the corresponding input token. For example, in some embodiments, if an input token is determined based at least in part on the output applying an ASR process to a subset of milliseconds of an audio data object, the token-wise audio segment for the corresponding input token comprises the subset of milliseconds, and the input data object may be determined based at least in part on the token-wise audio segment and/or an embedded representation of the noted token-wise audio segment. In some embodiments, the token-wise audio segment and the token-wise image segment are generated using a pretrained convolutional neural network machine learning model that is configured to generate an audio data object and/or an image data object to detect relevant portions for a corresponding input token.

The term "encoder transformer machine learning model" may refer to a data construct that is configured to describe parameters, hyper-parameters, and/or defined operations of a machine learning model that is configured to process an input data object for a corresponding input token to determine a hidden representation of the corresponding input token. In some embodiments, the hidden representation of a corresponding input token can be used to determine a contextual relevance representation for the corresponding input token. In some embodiments, inputs to the encoder transformer machine learning model comprise one or more vectors, with one vector corresponding to an input token, and/or one or more vectors each corresponding to a token-wise audio segment for the input token and/or corresponding to a token-wise image segment for the input token. In some embodiments, outputs of the encoder transformer machine learning model comprise a vector that comprises the hidden representation of a corresponding input token. In some embodiments, an encoder transformer machine learning model is trained in connection with a machine learning framework that comprises the encoder transformer machine learning model and a decoder transformer machine learning model. In some embodiments, an encoder transformer machine learning model is trained by using training data that include input data objects for a set of training tokens, and using a training task that generates next-token prediction for each current training token based at least in part on the output of processing the input data object for the current training token using a machine learning framework that includes the encoder transformer machine learning model and the decoder transformer machine learning model. In some embodiments, the encoder transformer machine learning model is a trained language model, such as a trained language model using an attention mechanism (e.g., a bidirectional attention mechanism, a multi-headed attention mechanism, and/or the like).

The term "contextual relevance representation" may refer to a data construct that is configured to describe an encoded representation of a corresponding input token that is generated based at least in part on a hidden representation of the corresponding input token, where the hidden representation may in turn be generated by processing an input data object for the corresponding input token using an encoder transformer machine learning model. In some embodiments, the contextual relevance representation for a current input token is generated by: (i) determining, based at least in part on an input data object for the current input token and using an encoder transformer machine learning model, a hidden representation of the current input token; (ii) determining, based at least in part on the hidden representation and using a contextual relevance determination non-linear machine learning model, a contextual relevance probability of the current input token; and (iii) determining, based at least in part on the hidden representation and the contextual relevance probability, and using a contextual relevance decision-making machine learning model, the contextual relevance representation for the current input token. In some embodiments, the contextual relevance representation for an input token describes: (i) if the contextual relevance probability for the input token satisfies a contextual relevance probability threshold, the hidden representation of the input token that is generated by the encoder transformer machine learning model; and (ii) if the contextual relevance probability for the input token fails to satisfy a contextual relevance probability threshold, a masked representation of the input token that describes a predefined masked token. In some embodiments, the contextual relevance representation for an input token describes the input token as well as a contextual relevance probability for the noted input token.

The term "contextual relevance determination machine learning model" may refer to a data construct that is configured to describe parameters, hyper-parameters, and/or defined operations of a machine learning model that is configured to process a hidden representation of an input token in order to generate a contextual relevance probability for the input token, where the hidden representation may in turn be generated by processing an input data object for the corresponding input token using an encoder transformer machine learning model. In some embodiments, the contextual relevance probability for an input token describes a likelihood that the input token is an accurate OCR/ASR output for the corresponding token-wise image segment/token-wise audio segment. In some embodiments, the contextual relevance probability for an input token describes a likelihood that the input token provides reliable contextual insights that are relevant to determining denoised representations for surrounding input tokens of the particular input token. In some embodiments, the contextual relevance determination machine learning model comprises a non-linear activation gate, such as a sigmoid gate, that is configured to process a hidden representation of an input token in order to generate a contextual relevance probability for the input token, where the hidden representation may in turn be generated by processing an input data object for the corresponding input token using an encoder transformer machine learning model. In some embodiments, inputs to the contextual relevance determination machine learning model comprise a vector describing a hidden representation of an input token, while outputs of the contextual relevance determination machine learning model comprise a vector describing contextual relevance probability for the noted input token.

The term "contextual relevance decision-making machine learning model" may refer to a data construct that is configured to describe parameters, hyper-parameters, and/or defined operations of a process that is configured to determine, based at least in part on a hidden representation of an input token that is generated by an encoder transformer machine learning model as well as a contextual relevance probability for the input token, a contextual relevance representation for the input token. The contextual relevance representation for an input token may describe either the input token or a masked representation of the input token. In some embodiments, the contextual relevance representation for an input token describes: (i) if the contextual relevance probability for the input token satisfies a contextual relevance probability threshold, the hidden representation of the input token that is generated by the encoder transformer machine learning model; and (ii) if the contextual relevance probability for the input token fails to satisfy a contextual relevance probability threshold, a masked representation of the input token that describes a predefined masked token. In some embodiments, the contextual relevance representation for an input token describes the input token as well as a contextual relevance probability for the noted input token. In some embodiments, the contextual relevance decision-making machine learning model is configured to: (i) determine whether the contextual relevance probability for the input token satisfies a contextual relevance probability threshold; (ii) if the contextual relevance probability for the input token satisfies the contextual relevance probability threshold, generate the contextual relevance representation based at least in part on the hidden representation of the input token that is generated by the encoder transformer machine learning model; and (iii) if the contextual relevance probability for the input token fails to satisfy a contextual relevance probability threshold, generate the contextual relevance representation based at least in part on a masked representation of the input token that describes a predefined masked token. In some embodiments, the contextual relevance representation for an input token describes the input token as well as a contextual relevance probability for the noted input token. In some embodiments, inputs to the contextual relevance decision-making machine learning model comprise a vector describing the input token and a vector describing the contextual relevance probability for the input token. In some embodiments, outputs of the contextual relevance decision-making machine learning model comprise a vector describing the contextual relevance representation for the input token.

The term "decoder transformer machine learning model" may refer to a data construct that is configured to describe parameters, hyper-parameters, and/or defined operations of a machine learning model that is configured to process a contextual relevance representation for an input token and a preceding denoised representation for a preceding input token for the input token (in an input sequence and in accordance with the token order for the input sequence) in order to generate a hidden representation that can then be used to generate a denoised representation for the input token. In some embodiments, the decoder transformer machine learning model is configured to generate the denoised representation for an input token based at least in part on more than one preceding tokens for the input token in the input sequence, e.g., based at least in part on all preceding input tokens for the input token in the input sequence. In some embodiments, the decoder transformer machine learning model is configured to generate the denoised representation for an input token based at least in part on n preceding tokens for the input token in the input sequence, where n is a hyper-parameter of the decoder transformer machine learning model. In some embodiments, the decoder transformer machine learning has a similar architecture to that of an encoder transformer machine learning model that is used to generate the contextual relevance representations that are provided as inputs to the decoder transformer machine learning model. In some embodiments, the decoder transformer machine learning model and the encoder transformer machine learning model are trained end-to-end. In some embodiments, determining a denoised representation for a current input token comprises determining, based at least in part on the contextual relevance representation and the preceding denoised representation for the preceding input token for the current input token in accordance with the token order, and using the decoder transformer machine learning model, a hidden representation of the current input token; determining, based at least in part on the hidden representation and using a denoising decision-making machine learning model, an overall denoising decision-making probability for the current input token, wherein: (i) the denoising decision-making machine learning model comprises a plurality of denoising decision gates and a probability combination gate; (ii) each denoising decision gate is configured to determine a denoising decision type probability based at least in part on the hidden representation; and (iii) the probability combination gate is configured to combine each denoising decision type probability to generate the overall denoising decision-making probability; and determining the denoised representation based at least in part on the overall denoising decision-making probability. In some embodiments, inputs to the decoder transformer machine learning model include a vector describing contextual relevance representation. In some embodiments, outputs of the contextual relevance representation include a vector describing a hidden representation.

The term "denoising decision-making machine learning model" may refer to a data construct that is configured to describe parameters, hyper-parameters, and/or defined operations of a machine learning model that is configured to process a hidden representation of an input token that is generated by a decoder transformer machine learning model to generate an overall decision-making probability for the input token. In some embodiments, the denoising decision-making machine learning model comprises a plurality of denoising decision gates, where each denoising decision gate is configured to process the hidden representation that is generated by the decoder transformer machine learning model in order to generate a denoising decision type probability. In some embodiments, the denoising decision-making machine learning model comprises a probability combination gate that is configured to combine (e.g., add up, linearly combine, average out, and/or the like) each denoising decision type probability to generate the overall denoising decision-making probability. In some embodiments, the plurality of denoising decision gates comprise a non-linear copy gate, a non-linear generate gate, and a non-linear skip gate. In some embodiments, inputs to the denoising decision-making machine learning model comprise a vector describing a hidden representation that is generated by the decoder transformer machine learning model. In some embodiments, outputs of the denoising decision-making machine learning model comprise a vector describing an overall denoising decision-making probability.

The term "denoising decision gate" may refer to a data construct that is configured to describe parameters, hyper-parameters, and/or defined operations of a process that is configured to determine, based at least in part on a hidden representation of an input token that is generated by a decoder transformer machine learning model, a denoising type probability, where the denoising decision probability describes a computed likelihood that a corresponding denoising operation is suitable for the input token. For example, an exemplary denoising decision gate is a copy gate (e.g., a non-linear copy gate using a non-linear gate such as a sigmoid gate) that is configured to generate a denoising decision probability that describes a computed likelihood that an input token is suitable to be copied without any changes as part of denoising an input sequence to generate a denoised sequence, and thus the copy gate is associated with a "copy token" denoising operation. As another example, another exemplary decision gate is a generate gate (e.g., a non-linear generate gate using a non-linear gate such as a sigmoid gate) that is configured to generate a denoising decision probability that describes a computed likelihood that an input token is suitable to be replaced with an alternative token denoising an input sequence to generate a denoised sequence, and thus the generate gate is associated with a "generate alternative token" denoising operation. As yet another example, another exemplary decision gate is a skip gate (e.g., a non-linear skip gate using a non-linear gate such as a sigmoid gate) that is configured to generate a denoising decision probability that describes a computed likelihood that an input token is suitable to be deleted denoising an input sequence to generate a denoised sequence, and thus the skip gate is associated with a "skip token" denoising operation.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis with respect to structured data objects. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated polygenic risk score predictions. Examples of predictive data analysis requests that may be processed by the predictive data analysis system 101 include request for generating an optical character recognition (OCR) and/or an automated speech recognition (ASR) output for an image data object and/or an audio data object.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive structured data predictive data analysis requests from one or more external computing entities 102, process the predictive data analysis requests to generate the predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis tasks as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 200 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 190, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 200 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

B. Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention address technical challenges related to improving efficiency and reliability of textual search systems. Textual search systems rely on inferring patterns based on underlying textual data to generate search outputs in response to search queries. When the underlying textual data has inaccuracies (e.g., spelling errors and/or errors resulting from erroneous optical character recognition (OCR) and/or erroneous automated speech recognition (ASR) processes), the search operations are likely to generate inaccurate results. This in turn causes the users to perform repeated search operations, which imposes operational load on textual search systems. In this way, textual inaccuracies impose both efficiency and reliability costs on textual search systems. By introducing techniques to enhance accuracy of textual data through denoising of textual data, various embodiments address the noted efficiency and reliability costs of textual search systems, and thus make important technical contributions to improving efficiency, reliability, and/or operational load of the textual search systems.

FIG. 4 is a flowchart diagram of an example process 400 for generating a denoised sequence for an input sequence. Via the various steps/operations of the process 400, the predictive data analysis computing entity 106 can perform intelligent data denoising on textual data generated by optical code recognition (OCR) and automated speech recognition (ASR) processes.

The process 400 begins at step/operation 401 when the predictive data analysis computing entity 106 identifies an input sequence comprising a set of input tokens. For example, the input sequence may be all or part of textual data generated by an OCR processes, all or part of textual data generated by an ASR processes, and/or all or part of textual data maintained in a database (e.g., in an electronic health record (EHR) database). An operational example of an input sequence 501 is depicted in FIG. 5. As depicted in FIG. 5, the input sequence 501 includes a set of input tokens 502 that are generated by the tokenization process 511.

An example of an input sequence is a sequence of text tokens generated by applying an optical code recognition (OCR) process to an input image data object, such as a sequence of text tokens that is determined (e.g., based at least in part on one or more sentence identification rules that are configured to process an overall sequence of text tokens generated using an OCR process to identify sentences based at least in part on the overall sequence) to correspond to a semantic linguistic construct such as a sentence. Another example of an input sequence is a sequence of text tokens generated by applying an automated speech recognition (ASR) process to an input audio data object, such as a sequence of text tokens that is determined (e.g., based at least in part on one or more sentence identification rules that are configured to process an overall sequence of text tokens generated using an ASR process to identify sentences based at least in part on the overall sequence) to correspond to a semantic linguistic construct such as a sentence. In some embodiments, an input sequence is associated with a token order, where the token order describes, for each input token, whether the input token is the nth token of the plurality of input tokens in the input sequence. For example, given the input sequence "T5he quicnk brown fox junps ovr the lazzy dug," where the input tokens of the input sequence comprise "T," "5," "he," "qui," "#c," "#nk," "brown," "fox," "ju," "#nps," "ov," "#r," "the," "laz," "#zy," and "dug," the token order for the given input sequence may define the following token order values for the noted input tokens: a token order of one for the input token "T," a token order of two for the input token "5," a token order of three for the input token "he," a token order of four for the input token "qui," a token order of five for the input token "#c," a token order of six for the input token "#nk," a token order of seven for the input token "brown," a token order of eight for the input token "fox," a token order of nine for the input token "ju," a token order of ten for the input token "#nps," a token order of eleven for the input token "ov," a token order of twelve for the input token "#r," a token order of thirteen for the input token "the," a token order of fourteen for the input token "laz," a token order of fifteen for the input token "#zy," and a token order of sixteen for the input token "dug."

At step/operation 402, the predictive data analysis computing entity 106 generates a contextual relevance representation of each input token of the input sequence. An operational example of a contextual relevance representation 503 is depicted in FIG. 5. In some embodiments, to generate the contextual relevance representation, the predictive data analysis computing entity 106 processes the input sequence using a machine learning framework that comprises at least one of an encoder transformer machine learning model, a contextual relevance determination machine learning model, and a contextual relevance decision-making machine learning model.

For example, as depicted in FIG. 6, the input sequence 601 comprising a set of input tokens (i.e., CLS, $x_1$, $x_2$, . . . $x_m$) is processed using an encoder transformer machine learning model 611 in order to generate a hidden representation 602 for each token (i.e., hidden representations $h_1$, $h_2$, $h_3$, . . . $h_m$). As further depicted in FIG. 6, the hidden representation 602 for each input token is processed by the contextual relevance determination machine learning model 612 to generate a contextual relevance probability for the input token, where the contextual relevance probability for the input token and the hidden representation 602 for the input token are then processed by the contextual relevance decision-making machine learning model 613 to generate the contextual relevance representation 603 for the input token.

In some embodiments, step/operation 402 is performed in accordance with the process that is depicted in FIG. 7, which is an example process for generating a contextual relevance representation for an input token. The process that is depicted in FIG. 7 begins at step/operation 701 when the predictive data analysis computing entity 106 generates an input data object for the input token. In some embodiments, an input data object is an input representation of a corresponding input token that is provided as an input to an encoder transformer machine learning model. In some embodiments, the input data object for a corresponding input token is determined based at least in part on (e.g., comprises) the corresponding input token.

In some embodiments, the input data object for a corresponding input token is determined based at least in part on (e.g., comprises) a one-hot encoding of the corresponding input token. In some embodiments, the input data object for a corresponding input token is determined based at least in part on (e.g., comprises) a token-wise image segment of an image data object that is associated with the corresponding input token. In some embodiments, the input data object for a corresponding input token is determined based at least in part on (e.g., comprises) an embedded representation of a token-wise image segment of an image data object that is associated with the corresponding input token. For example, in some embodiments, if an input token is determined based at least in part on the output applying an OCR process to a subset of pixels of an image data object, the token-wise image segment may comprise the subset of pixels, and the input data object may be determined based at least in part on the token-wise image segment and/or an embedded representation of the noted token-wise image segment. In some embodiments, the input data object for a corresponding input token is determined based at least in part on (e.g., comprises) a token-wise audio segment of an audio data object that is associated with the corresponding input token. In some embodiments, the input data object for a corresponding input token is determined based at least in part on (e.g., comprises) an embedded representation a token-wise audio segment of an audio data object that is associated with the corresponding input token. For example, in some embodiments, if an input token is determined based at least in part on the output applying an ASR process to a subset of milliseconds of an audio data object, the token-wise audio segment for the corresponding input token comprises the subset of milliseconds, and the input data object may be determined based at least in part on the token-wise audio segment and/or an embedded representation of the noted token-wise audio segment.

At step/operation 702, the predictive data analysis computing entity 106 processes the input data object using an encoder transformer machine learning model to generate a hidden representation of the input token. In some embodiments, the encoder transformer machine learning model is configured to process an input data object for a corresponding input token to determine a hidden representation of the corresponding input token. In some embodiments, the hidden representation of a corresponding input token can be used to determine a contextual relevance representation for the corresponding input token.

In some embodiments, inputs to the encoder transformer machine learning model comprise one or more vectors, with one vector corresponding to an input token, and/or one or more vectors each corresponding to a token-wise audio segment for the input token and/or corresponding to a token-wise image segment for the input token. In some embodiments, outputs of the encoder transformer machine learning model comprise a vector that comprises the hidden representation of a corresponding input token. In some embodiments, an encoder transformer machine learning model is trained in connection with a machine learning framework that comprises the encoder transformer machine learning model and a decoder transformer machine learning model. In some embodiments, an encoder transformer machine learning model is trained by using training data that include input data objects for a set of training tokens, and using a training task that generates next-token prediction for each current training token based at least in part on the output of processing the input data object for the current training token using a machine learning framework that includes the encoder transformer machine learning model and the decoder transformer machine learning model. In some embodiments, the encoder transformer machine learning model is a trained language model, such as a trained language model using an attention mechanism (e.g., a bidirectional attention mechanism, a multi-headed attention mechanism, and/or the like).

At step/operation 703, the predictive data analysis computing entity 106 processes the hidden representation of the input token as generated by the encoder transformer machine learning model using a contextual relevance determination machine learning model to generate a contextual relevance probability for the input token, where the hidden representation may in turn be generated by processing an input data object for the corresponding input token using an encoder transformer machine learning model. In some embodiments, the contextual relevance probability for an input token describes a likelihood that the input token is an accurate OCR/ASR output for the corresponding token-wise image segment/token-wise audio segment. In some embodiments, the contextual relevance probability for an input token describes a likelihood that the input token provides reliable contextual insights that are relevant to determining denoised representations for surrounding input tokens of the particular input token.

In some embodiments, the contextual relevance determination machine learning model comprises a non-linear activation gate, such as a sigmoid gate, that is configured to process a hidden representation of an input token in order to generate a contextual relevance probability for the input token, where the hidden representation may in turn be generated by processing an input data object for the corresponding input token using an encoder transformer machine learning model. In some embodiments, inputs to the contextual relevance determination machine learning model comprise a vector describing a hidden representation of an input token, while outputs of the contextual relevance determination machine learning model comprise a vector describing contextual relevance probability for the noted input token.

At step/operation 704, the predictive data analysis computing entity 106 processes the contextual relevance probability of the input token as generated by the contextual relevance determination machine learning model using a contextual relevance decision-making machine learning model to generate the contextual relevance representation for the input token.

In some embodiments, a contextual relevance representation is an encoded representation of a corresponding input token that is generated based at least in part on a hidden representation of the corresponding input token, where the hidden representation may in turn be generated by processing an input data object for the corresponding input token using an encoder transformer machine learning model. In some embodiments, the contextual relevance representation for a current input token is generated by: (i) determining, based at least in part on an input data object for the current input token and using an encoder transformer machine learning model, a hidden representation of the current input token; (ii) determining, based at least in part on the hidden representation and using a contextual relevance determination non-linear machine learning model, a contextual relevance probability of the current input token; and (iii) determining, based at least in part on the hidden representation and the contextual relevance probability, and using a contextual relevance decision-making machine learning model, the contextual relevance representation for the current input token. In some embodiments, the contextual relevance representation for an input token describes: (i) if the contextual relevance probability for the input token satisfies a contextual relevance probability threshold, the hidden representation of the input token that is generated by the encoder transformer machine learning model; and (ii) if the contextual relevance probability for the input token fails to satisfy a contextual relevance probability threshold, a masked representation of the input token that describes a predefined masked token. In some embodiments, the contextual relevance representation for an input token describes the input token as well as a contextual relevance probability for the noted input token.

In some embodiments, a contextual relevance decision-making machine learning model is configured to process a hidden representation of an input token in order to generate a contextual relevance probability for the input token, where the hidden representation may in turn be generated by processing an input data object for the corresponding input token using an encoder transformer machine learning model. In some embodiments, the contextual relevance probability for an input token describes a likelihood that the input token is an accurate OCR/ASR output for the corresponding token-wise image segment/token-wise audio segment. In some embodiments, the contextual relevance probability for an input token describes a likelihood that the input token provides reliable contextual insights that are relevant to determining denoised representations for surrounding input tokens of the particular input token. In some embodiments, the contextual relevance determination machine learning model comprises a non-linear activation gate, such as a sigmoid gate, that is configured to process a hidden representation of an input token in order to generate a contextual relevance probability for the input token, where the hidden representation may in turn be generated by processing an input data object for the corresponding input token using an encoder transformer machine learning model. In some embodiments, inputs to the contextual relevance determination machine learning model comprise a vector describing a hidden representation of an input token, while outputs of the contextual relevance determination machine learning model comprise a vector describing contextual relevance probability for the noted input token.

Returning to FIG. 4, at step/operation 403, the predictive data analysis computing entity 106 generates a denoised representation for each input token in the input sequence based at least in part on the contextual relevance representation for the input token. In some embodiments, to generate the denoised representation, the predictive data analysis computing entity 106 processes the contextual relevance representation using a machine learning framework that comprises at least one of a decoder transformer machine learning model and an overall denoising decision-making probability.

In some embodiments, step/operation 403 may be performed in accordance with the process that is depicted in FIG. 8, which is an example process for generating a denoised representation of an input token based at least in part on a contextual relevance representation for the input token. The process that is depicted in FIG. 8 begins at step/operation 801 when the predictive data analysis computing entity 106 processes the contextual relevance representation for the input token using a decoder transformer machine learning model to generate a hidden representation for the input token. For example, as depicted in FIG. 6, each contextual relevance representation 603 for an input token is processed by the decoder transformer machine learning model 614 to generate a hidden representation 604 for the input token (i.e., hidden representations $h'_1, h'_2, h'_3, \ldots h'_m$).

In some embodiments, the decoder transformer machine learning framework is configured to process a contextual relevance representation for an input token and a preceding denoised representation for a preceding input token for the input token (in an input sequence and in accordance with the token order for the input sequence) in order to generate a hidden representation that can then be used to generate a denoised representation for the input token. In some embodiments, the decoder transformer machine learning model is configured to generate the denoised representation for an input token based at least in part on more than one preceding tokens for the input token in the input sequence, e.g., based at least in part on all preceding input tokens for the input token in the input sequence.

In some embodiments, the decoder transformer machine learning model is configured to generate the denoised representation for an input token based at least in part on n preceding tokens for the input token in the input sequence, where n is a hyper-parameter of the decoder transformer machine learning model. In some embodiments, the decoder transformer machine learning has a similar architecture to that of an encoder transformer machine learning model that is used to generate the contextual relevance representations that are provided as inputs to the decoder transformer machine learning model. In some embodiments, the decoder transformer machine learning model and the encoder transformer machine learning model are trained end-to-end.

In some embodiments, determining a denoised representation for a current input token comprises determining, based at least in part on the contextual relevance representation and the preceding denoised representation for the preceding input token for the current input token in accordance with the token order, and using the decoder transformer machine learning model, a hidden representation of the current input token; determining, based at least in part on the hidden representation and using a denoising decision-making machine learning model, an overall denoising decision-making probability for the current input token, wherein: (i) the denoising decision-making machine learning model comprises a plurality of denoising decision gates and a probability combination gate; (ii) each denoising decision gate is configured to determine a denoising decision type probability based at least in part on the hidden representation; and (iii) the probability combination gate is configured to combine each denoising decision type probability to generate the overall denoising decision-making probability; and determining the denoised representation based at least in part on the overall denoising decision-making probability. In some embodiments, inputs to the decoder transformer machine learning model include a vector describing contextual relevance representation. In some embodiments, outputs of the contextual relevance representation include a vector describing a particular hidden representation.

At step/operation 802, the predictive data analysis computing entity 106 processes the hidden representation that is generated by the decoder transformer machine learning model using a denoising decision-making machine learning model to generate an overall decision-making probability for the input token. In some embodiments, the denoising decision-making machine learning model is configured to process a hidden representation of an input token that is generated by a decoder transformer machine learning model to generate an overall decision-making probability for the input token. In some embodiments, the denoising decision-making machine learning model comprises a plurality of denoising decision gates, where each denoising decision gate is configured to process the hidden representation that is generated by the decoder transformer machine learning model in order to generate a denoising decision type probability.

In some embodiments, the denoising decision-making machine learning model comprises a probability combination gate that is configured to combine (e.g., add up, linearly combine, average out, and/or the like) each denoising decision type probability to generate the overall denoising decision-making probability. In some embodiments, the plurality of denoising decision gates comprise a non-linear copy gate, a non-linear generate gate, and a non-linear skip gate. In some embodiments, inputs to the denoising decision-making machine learning model comprise a vector describing a hidden representation that is generated by the decoder transformer machine learning model. In some embodiments, outputs of the denoising decision-making machine learning model comprise a vector describing an overall denoising decision-making probability.

In some embodiments, the denoising decision-making machine learning model comprises a set of denoising decision gates. In some embodiments, a denoising decision gate is configured to determine, based at least in part on a hidden representation of an input token that is generated by a decoder transformer machine learning model, a denoising type probability, where the denoising decision probability describes a computed likelihood that a corresponding denoising operation is suitable for the input token. For example, an exemplary denoising decision gate is a copy gate (e.g., a non-linear copy gate using a non-linear gate such as a sigmoid gate) that is configured to generate a denoising decision probability that describes a computed likelihood that an input token is suitable to be copied without any changes as part of denoising an input sequence to generate a denoised sequence, and thus the copy gate is associated with a "copy token" denoising operation.

As another example, another exemplary decision gate is a generate gate (e.g., a non-linear generate gate using a non-linear gate such as a sigmoid gate) that is configured to generate a denoising decision probability that describes a computed likelihood that an input token is suitable to be replaced with an alternative token denoising an input sequence to generate a denoised sequence, and thus the generate gate is associated with a "generate alternative token" denoising operation. As yet another example, another exemplary decision gate is a skip gate (e.g., a non-linear skip gate using a non-linear gate such as a sigmoid gate) that is configured to generate a denoising decision probability that describes a computed likelihood that an input token is suitable to be deleted denoising an input sequence to generate a denoised sequence, and thus the skip gate is associated with a "skip token" denoising operation.

An operational example of generating an overall decision-making probability for an input token is depicted in FIG. 6. As depicted in FIG. 6, for an input token, the hidden representation 604 for the input token is processed by the denoising decision-making machine learning model 615 to generate an overall decision-making probability. As further depicted in FIG. 6, the denoising decision-making machine learning model 615 comprises three denoising decision gates 621-623 that each is configured to generate a denoising type probability and a probability combination gate 624 that is configured to combine denoising type probabilities to generate an overall decision-making probability.

An operational example of the denoising type probability set 504 for a set of tokens as generated by a skip gate, the denoising type probability set 505 for a set of tokens as generated by a copy gate, and the denoising type probability set 506 for a set of tokens as generated by a generate gate is depicted in FIG. 5.

At step/operation 803, the predictive data analysis computing entity 106 determines the denoising representation of the input token based at least in part on the overall decision-making probability for the input token. In some embodiments, if the overall decision-making probability describes that the input token should be deleted/skipped, the denoising representation is a null denoising representation. In some embodiments, if the overall decision-making probability describes that the input token should be copied, the denoising representation is a representation of the input token. In some embodiments, if the overall decision-making probability describes that the input token should be replaced, the denoising representation is a representation of a generated replacement token for the input token. An operational example of a denoising representation 605 for each input token is depicted in FIG. 6.

Returning to FIG. 4, at step/operation 404, the predictive data analysis computing entity 106 generates the denoised sequence based at least in part on each denoised representation for an input token in the input sequence. In some embodiments, to generate the denoised sequence, the predictive data analysis computing entity 106 combines each denoised representation for an input token in the input sequence. An operational example of a denoising sequence 507 for the input sequence 501 is depicted in FIG. 5.

By generating denoised sequences, various embodiments of the present invention address technical challenges related to improving efficiency and reliability of textual search systems. Textual search systems rely on inferring patterns based on underlying textual data to generate search outputs in response to search queries. When the underlying textual data has inaccuracies (e.g., spelling errors and/or errors resulting from erroneous optical character recognition (OCR) and/or erroneous automated speech recognition (ASR) processes), the search operations are likely to generate inaccurate results. This in turn causes the users to perform repeated search operations, which imposes operational load on textual search systems. In this way, textual inaccuracies impose both efficiency and reliability costs on textual search systems. By introducing techniques to enhance accuracy of textual data through denoising of textual data, various embodiments address the noted efficiency and reliability costs of textual search systems, and thus make important technical contributions to improving efficiency, reliability, and/or operational load of the textual search systems.

At step/operation 405, the predictive data analysis computing entity 106 performs one or more prediction-based actions based at least in part on the denoised sequence. In some embodiments, the predictive data analysis computing entity 106 uses the denoised sequence to generate an OCR/ASR output that is then presented by a prediction output user interface. In some embodiments, the predictive data analysis computing entity 106 transmits the user interface data for the prediction output user interface to an external computing entity 102 for display by the external computing entity 102. In some embodiments, the predictive data analysis computing entity 106 presents the prediction output user interface.

In some embodiments, the predictive data analysis computing entity 106 processes the denoised sequence using a prediction machine learning model in order to generate a prediction output and performs prediction-based actions based at least in part on the prediction output. For example, the prediction output may describe a likelihood that a patient identifier associated with the denoised sequence suffers from a particular condition. In some embodiments, in response to determining that the determined likelihood satisfies a threshold, the predictive data analysis computing entity 106 automatically schedules a medical appointment corresponding to the particular condition for the patient identifier. In some embodiments, in response to determining that the determined likelihood satisfies a threshold, the predictive data analysis computing entity 106 automatically adjusts a diagnostic device of the patient identifier to record data corresponding to the particular condition.

In some embodiments, the predictive data analysis computing entity 106 combines the denoised sequence using other denoised sequences to generate a denoised database. In some embodiments, the predictive data analysis computing entity 106 generates multiple copies of the denoised database. In some embodiments, in response to determining that a primary copy of the denoised database is unavailable, the predictive data analysis computing entity 106 provides access to a replicated version of the denoised database. In some embodiments, the predictive data analysis computing entity 106 maintains a diff file describing differences between a denoised database and an original database. In some embodiments, the predictive data analysis computing entity 106 provides access to the diff file in response to user requests and/or in response to automatic audit queries.

Thus, as described above, various embodiments of the present invention address technical challenges related to improving efficiency and reliability of textual search systems. Textual search systems rely on inferring patterns based on underlying textual data to generate search outputs in response to search queries. When the underlying textual data has inaccuracies (e.g., spelling errors and/or errors resulting from erroneous optical character recognition (OCR) and/or erroneous automated speech recognition (ASR) processes), the search operations are likely to generate inaccurate results. This in turn causes the users to perform repeated search operations, which imposes operational load on textual search systems. In this way, textual inaccuracies impose both efficiency and reliability costs on textual search systems. By introducing techniques to enhance accuracy of textual data through denoising of textual data, various embodiments address the noted efficiency and reliability costs of textual search systems, and thus make important technical contributions to improving efficiency, reliability, and/or operational load of the textual search systems.

Once generated, a denoised sequence can be used to perform denoising on OCR/ASR output data. An operational example of performing data denoising on OCR/ASR output data is depicted in FIG. 9. As depicted in FIG. 9, the input data for the OCR include image data 901 (e.g., image data having a portable document format (PDF)), while input data for the ASR include audio data 902. The input data are stored in a data storage 903 and retrieved by an intelligent data denoiser 904 to generate denoised sequences 905 for input sequences that are extracted from the input data.

As described above, the intelligent data denoiser 904 may use one or more machine learning frameworks (e.g., a machine learning framework having at least one component that is depicted in FIG. 6), which may be retrained from time to time using a retraining engine 906. Another operational example of a machine learning framework 1000 for an intelligent data denoiser 904 is depicted in FIG. 10. As depicted in FIG. 10, the machine learning framework 1000 comprises: (i) an encoder transformer machine learning model 611 (e.g., a bidirectional encoder) that is configured to generate hidden representations for each input token in a set of input tokens 1001, (ii) a contextual relevance decision-making machine learning model 613 that is configured to process data determined based on hidden representations for input tokens to generate contextual relevance representations for the input tokens, and (iii) a decoder transformer machine learning model 614 (e.g., an autoregressive encoder) that is configured to process data determined based on contextual relevance representations as well as the input tokens 1001 for the input tokens to generate data that can be used to generate denoised tokens of a denoised sequence 1002. Therefore, in at least some embodiments, at least during training, inputs to a decoder transformer machine learning model include tokens as well as contextual relevance representations of the noted tokens. As further depicted in FIG. 10, the contextual relevance decision-making machine learning model 613 is configured to determine, using the process 1011, whether to copy an input token, to remove the input token, or whether to generate an alternative token for the input token in order to generate the denoised sequence 1002.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

determining, by one or more processors, an input data object corresponding to an input token;

determining, by the one or more processors and using an encoder transformer machine learning model, a hidden representation of the input token;

determining, by the one or more processors and using a contextual relevance determination non-linear machine learning model, and based at least in part on the hidden representation, a contextual relevance probability, associated with the input token, that indicates a likelihood that the input token provides reliable contextual information usable in determining denoised representations of one or more surrounding input tokens;

determining, by the one or more processors and using the contextual relevance decision-making machine learning model, a contextual relevance representation corresponding to the input token based at least in part on the contextual relevance probability and the hidden representation, wherein the contextual relevance representation comprises a copy probability, a removal probability, or a generation probability, and the contextual relevance representation describes the hidden representation or a masked representation based on a contextual relevance probability threshold;

determining, by the one or more processors and using a decoder transformer machine learning model, a denoised representation for the input token based at least in part on the contextual relevance representation and a preceding denoised representation for a preceding input token that precedes the input token in accordance with a token order;

determining, by the one or more processors, a denoised sequence based at least in part on the denoised representation; and initiating, by the one or more processors, a performance of one or more prediction-based actions based at least in part on the denoised sequence.

2. The computer-implemented method of claim 1, wherein determining the input data object corresponding to the input token comprises determining the input data object based at least in part on the input token and a token-wise image segment of an image data object that is associated with the input token.

3. The computer-implemented method of claim 1, wherein determining the input data object corresponding to the input token comprises determining the input data object based at least in part on the input token and a token-wise audio segment of an audio data object that is associated with the input token.

4. The computer-implemented method of claim 1, wherein determining the contextual relevance representation for the input token comprises:

determining, based at least in part on the input data object for the input token and using the encoder transformer machine learning model, the hidden representation of the input token;

determining, based at least in part on the hidden representation and using the contextual relevance determination non-linear machine learning model, the copy probability, the removal probability, or the generation probability corresponding to the input token; and determining, based at least in part on the hidden representation and the copy probability, the removal probability, or the generation probability, and using the contextual relevance decision-making machine learning model, the contextual relevance representation for the input token.

5. The computer-implemented method of claim 1, wherein determining the denoised representation for the input token comprises:

determining, based at least in part on the contextual relevance representation and the preceding denoised representation for the preceding input token for the input token in accordance with the token order, and using the decoder transformer machine learning model, the hidden representation of the input token;

determining, based at least in part on the hidden representation and using a denoising decision-making machine learning model, an overall denoising decision-making probability for the input token, wherein: (i) the denoising decision-making machine learning model comprises a plurality of denoising decision gates and a probability combination gate; (ii) the plurality of denoising decision gates are configured to determine a plurality of denoising decision type probabilities based at least in part on the hidden representation; and (iii) the probability combination gate is configured to combine the plurality of denoising decision type probabilities to generate the overall denoising decision-making probability; and determining the denoised representation based at least in part on the overall denoising decision-making probability.

6. The computer-implemented method of claim 5, wherein the plurality of denoising decision gates comprise a non-linear copy gate, a non-linear generate gate, and a non-linear skip gate.

7. The computer-implemented method of claim 1, further comprising:

responsive to the copy probability satisfying a copy threshold, the input token is copied to the denoised sequence;

responsive to the removal probability satisfying a removal threshold, the input token is removed in the denoised sequence; and responsive to the generation probability satisfying a generation threshold, the input token is replaced in the denoised sequence by a different generated word token.

8. The computer-implemented method of claim 1, wherein the contextual relevance representation for the input token comprises:

(i) the hidden representation generated by the encoder transformer machine learning model, responsive to the contextual relevance probability for the input token satisfying the contextual relevance probability threshold; or (ii) the masked representation of the input token that comprises a predefined masked token, responsive to the contextual relevance probability for the input token not satisfying the contextual relevance probability threshold.

9. A system comprising:

one or more processors; and one or more memories storing processor-executable instructions that, when executed by the one or more processors, cause the one or more processors to perform operations comprising:

determining an input data object corresponding to an input token;

determining, using an encoder transformer machine learning model, a hidden representation of the input token;

determining, using a contextual relevance determination non-linear machine learning model, and based at least in part on the hidden representation, a contextual relevance probability associated with the input token, that indicates a likelihood that the input token provides reliable contextual information usable in determining denoised representations of one or more surrounding input tokens;

determining, using a contextual relevance decision-making machine learning model, a contextual relevance representation corresponding to the input token based at least in part on the contextual relevance probability and the hidden representation, wherein the contextual relevance representation comprises a copy probability, a removal probability, or a generation probability, and the contextual relevance representation describes the hidden representation or a masked representation based on a contextual relevance probability threshold;

determining, using a decoder transformer machine learning model, a denoised representation for the input token based at least in part on the contextual relevance representation and a preceding denoised representation for a preceding input token that precedes the input token in accordance with a token order;

determining a denoised sequence based at least in part on the denoised representation; and initiating a performance of one or more prediction-based actions based at least in part on the denoised sequence.

10. The system of claim 9, wherein determining the input data object corresponding to the input token comprises determining the input data object based at least in part on the input token and a token-wise image segment of an image data object that is associated with the input token.

11. The system of claim 9, wherein determining the input data object corresponding to the input token comprises determining the input data object based at least in part on the input token and a token-wise audio segment of an audio data object that is associated with the input token.

12. The system of claim 9, wherein determining the contextual relevance representation for the input token comprises:

determining, based at least in part on the input data object for the input token and using the encoder transformer machine learning model, the hidden representation of the input token;

determining, based at least in part on the hidden representation and using the contextual relevance determination non-linear machine learning model, the copy probability, the removal probability, or the generation probability corresponding to the input token; and determining, based at least in part on the hidden representation and the copy probability, the removal probability, or the generation probability, and using a contextual relevance decision-making machine learning model, the contextual relevance representation for the input token.

13. The system of claim 12, wherein the contextual relevance determination non-linear machine learning model comprises a sigmoid activation gate.

14. The system of claim 9, wherein determining the denoised representation for the input token comprises:

determining, based at least in part on the contextual relevance representation and the preceding denoised representation for the preceding input token for the input token in accordance with the token order, and using the decoder transformer machine learning model, the hidden representation of the input token;

determining, based at least in part on the hidden representation and using a denoising decision-making machine learning model, an overall denoising decision-making probability for the input token, wherein: (i) the denoising decision-making machine learning model comprises a plurality of denoising decision gates and a probability combination gate; (ii) the plurality of denoising decision gates are configured to determine a plurality of denoising decision type probabilities based at least in part on the hidden representation; and (iii) the probability combination gate is configured to combine the plurality of denoising decision type probabilities to generate the overall denoising decision-making probability; and determining the denoised representation based at least in part on the overall denoising decision-making probability.

15. One or more non-transitory computer-readable media storing processor-executable instructions that, when executed by one or more processors, cause the one or more processors to perform operations comprising:

determining an input data object corresponding to an input token;

determining, using an encoder transformer machine learning model, a hidden representation of the input token;

determining, using a contextual relevance determination non-linear machine learning model, and based at least in part on the hidden representation, a contextual relevance probability associated with the input token, that indicates a likelihood that the input token provides reliable contextual information usable in determining denoised representations of one or more surrounding input tokens;

determining, using a contextual relevance decision-making machine learning model, a contextual relevance representation corresponding to the input token based at least in part on the contextual relevance probability and the hidden representation, wherein the contextual relevance representation comprises a copy probability, a removal probability, or a generation probability, and the contextual relevance representation describes the hidden representation or a masked representation based on a contextual relevance probability threshold;

determining, using a decoder transformer machine learning model, a denoised representation for the input token based at least in part on the contextual relevance representation and a preceding denoised representation for a preceding input token that precedes the input token in accordance with a token order;

determining a denoised sequence based at least in part on the denoised representation; and initiating a performance of one or more prediction-based actions based at least in part on the denoised sequence.

16. The one or more non-transitory computer-readable media storing the processor-executable instructions of claim 15, wherein determining the input data object corresponding to the input token comprises determining the input data object based at least in part on the input token and a token-wise image segment of an image data object that is associated with the input token.

17. The one or more non-transitory computer-readable media storing the processor-executable instructions of claim 15, wherein determining the input data object corresponding to the input token comprises determining the input data object based at least in part on the input token and a token-wise audio segment of an audio data object that is associated with the input token.

18. The one or more non-transitory computer-readable media storing the processor-executable instructions of claim 15, wherein determining the contextual relevance representation for the input token comprises:

determining, based at least in part on the input data object for the input token and using the encoder transformer machine learning model, the hidden representation of the input token;

determining, based at least in part on the hidden representation and using the contextual relevance determination non-linear machine learning model, the copy probability, the removal probability, or the generation probability corresponding to the input token; and determining, based at least in part on the hidden representation and the copy probability, the removal probability, or the generation probability, and using a contextual relevance decision-making machine learning model, the contextual relevance representation for the input token.

19. The one or more non-transitory computer-readable media storing the processor-executable instructions of claim 18, wherein the contextual relevance determination non-linear machine learning model comprises a sigmoid activation gate.

20. The one or more non-transitory computer-readable media storing the processor-executable instructions of claim 15, wherein determining the denoised representation for the input token comprises:

determining, based at least in part on the contextual relevance representation and the preceding denoised representation for the preceding input token for the input token in accordance with the token order, and using the decoder transformer machine learning model, the hidden representation of the input token;

determining, based at least in part on the hidden representation and using a denoising decision-making machine learning model, an overall denoising decision-making probability for the input token, wherein: (i) the denoising decision-making machine learning model comprises a plurality of denoising decision gates and a probability combination gate; (ii) the plurality of denoising decision gates are configured to determine a plurality of denoising decision type probabilities based at least in part on the hidden representation; and (iii) the probability combination gate is configured to combine the plurality of denoising decision type probabilities to generate the overall denoising decision-making probability; and determining the denoised representation based at least in part on the overall denoising decision-making probability.

* * * * *